(12) United States Patent
Price

(10) Patent No.: US 7,142,788 B2
(45) Date of Patent: Nov. 28, 2006

(54) OPTICAL COMMUNICATIONS SYSTEMS, DEVICES, AND METHODS

(75) Inventor: Alistair J. Price, Columbia, MD (US)

(73) Assignee: Corvis Corporation, Columbia, MD (US)

( * ) Notice: Subject to any disclaimer, the term of this patent is extended or adjusted under 35 U.S.C. 154(b) by 628 days.

(21) Appl. No.: 10/123,821

(22) Filed: Apr. 16, 2002

(65) Prior Publication Data

US 2004/0208614 A1 Oct. 21, 2004

(51) Int. Cl.
*H04B 10/04* (2006.01)

(52) U.S. Cl. ...................... 398/184; 398/201

(58) Field of Classification Search ............... 359/181, 359/237, 180, 183, 188, 301, 184; 398/102, 398/184, 201
See application file for complete search history.

(56) References Cited

U.S. PATENT DOCUMENTS

| | | | |
|---|---|---|---|
| 3,699,480 A | 10/1972 | Mueller | |
| 3,956,626 A | 5/1976 | Ross | |
| 4,663,596 A | 5/1987 | Heeks | |
| 4,666,255 A | 5/1987 | Taylor et al. | |
| 4,684,215 A | 8/1987 | Shaw et al. | |
| 4,897,622 A | 1/1990 | Cheo et al. | |
| 4,989,200 A | 1/1991 | Olshansky et al. | |
| 5,101,450 A | 3/1992 | Olshansky | |
| 5,111,322 A | 5/1992 | Bergano | |
| 5,115,440 A | 5/1992 | Gysel et al. | |
| 5,134,509 A | 7/1992 | Olshansky et al. | |
| 5,239,401 A | 8/1993 | Olshansky | |
| 5,249,201 A | 9/1993 | Posner et al. | |
| 5,278,923 A | 1/1994 | Nazarathy et al. | |
| 5,301,058 A | 4/1994 | Olshansky | |
| 5,304,945 A | 4/1994 | Myer | |
| 5,394,261 A | 2/1995 | Nakamura | |
| 5,418,637 A | 5/1995 | Kuo | |
| 5,432,632 A | 7/1995 | Watanabe | |
| 5,434,937 A | 7/1995 | Glance | |
| 5,446,574 A | 8/1995 | Djupsjobacka et al. | |
| 5,453,868 A | 9/1995 | Blauvelt et al. | |
| 5,526,159 A | 6/1996 | Gottwald | |
| 5,526,162 A | 6/1996 | Bergano | |
| 5,543,952 A | 8/1996 | Yonenaga et al. | |
| 5,555,118 A | 9/1996 | Huber | |
| 5,596,436 A | 1/1997 | Sargis et al. | |
| 5,734,493 A | 3/1998 | Jopson | |
| 5,745,273 A * | 4/1998 | Jopson | 398/192 |
| 5,777,771 A | 7/1998 | Smith | |
| 5,778,128 A | 7/1998 | Wildeman | |
| 5,781,326 A * | 7/1998 | Chiaroni et al. | 359/237 |
| 5,781,673 A | 7/1998 | Reed et al. | |

(Continued)

FOREIGN PATENT DOCUMENTS

EP 0484791 B1 12/1995

(Continued)

OTHER PUBLICATIONS

Hall, K.L. et al., 100 Gb/s All-Optical Logic, OFC '98 Post-Deadline Paper PD5-1 to PD5-3.

(Continued)

*Primary Examiner*—Leslie Pascal

(57) ABSTRACT

Systems, apparatuses, and methods for producing and utilizing orthogonal optical data signals, which can be produced by modulating electrical data signals onto orthogonal polarization components of an optical carrier traveling in opposite directions in a common modulator. The modulator can include one or more traveling wave electrodes having first and second ends with a first electrical data input connected to the first end and a second electrical data input connected to the second end.

19 Claims, 27 Drawing Sheets

U.S. PATENT DOCUMENTS

| | | | |
|---|---|---|---|
| 5,787,211 A | 7/1998 | Gopalakrishnan | |
| 5,798,854 A | 8/1998 | Blauvelt et al. | |
| 5,801,871 A | 9/1998 | Madabhushi | |
| 5,812,294 A | 9/1998 | Wilson | |
| 5,850,305 A | 12/1998 | Pidgeon | |
| 5,870,213 A | 2/1999 | Ishikawa et al. | |
| 5,909,297 A | 6/1999 | Ishikawa et al. | |
| 5,917,638 A | 6/1999 | Franck et al. | |
| 5,930,414 A | 7/1999 | Fishman et al. | |
| 5,999,300 A | 12/1999 | Davies et al. | |
| 5,999,667 A | 12/1999 | Castoldi et al. | |
| 6,005,701 A | 12/1999 | Hardy et al. | |
| 6,046,838 A | 4/2000 | Kou et al. | |
| 6,141,127 A | 10/2000 | Boivin et al. | |
| 6,262,834 B1 * | 7/2001 | Nichols et al. | 359/301 |
| 6,525,857 B1 * | 2/2003 | Way et al. | 398/192 |
| 2002/0191261 A1 * | 12/2002 | Notargiacomo et al. | 359/181 |

FOREIGN PATENT DOCUMENTS

| | | |
|---|---|---|
| JP | 04074034 | 3/1992 |
| JP | 10056661 A | 2/1998 |

OTHER PUBLICATIONS

Johnstone, W. et al., Integrated Optical Frequency Translators, IEE Colloquium on Advances in Coherent Optic Devices and Technologies, pp. 211-216, (Mar. 26, 1985).

Iwashita, Katsushi and Takachio, Noboru, Chromatic Dispersion Compensation in Coherent Optical Communications, Mar. 1990, pp. 367-374, Journal of Lightwave Technology.

Alferness, Rod C. and Koch, Thomas L., Dispersion Compensation by Active Predistorted Signal Synthesis, Aug. 1985, pp. 800-805, Journal of Lightwave Technology.

* cited by examiner

OPTICAL COMMUNICATIONS SYSTEMS, DEVICES, AND METHODS

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present invention is directed generally to the transmission of signals in optical communications systems. More particularly, the invention relates to systems, devices, and methods for producing and transmitting modulated optical signals having different polarization orientations.

The development of digital technology provided the ability to store and process vast amounts of information. While this development greatly increased information processing capabilities, it was soon recognized that in order to make effective use of information resources it was necessary to interconnect and allow communication between information resources. Efficient access to information resources requires the continued development of information transmission systems to facilitate the sharing of information between resources. One effort to achieve higher transmission capacities has focused on the development of optical transmission systems. Optical transmission systems can provide high capacity, low cost, low error rate transmission of information over long distances.

The transmission of information over optical systems is typically performed by imparting the information in some manner onto an optical signal. In most optical transmission systems the information is imparted by using an electrical data stream either to directly modulate an optical source or to externally modulate an optical carrier so that the information is carried at the frequency of the optical carrier, or to modulate the information onto one or more subcarriers or sidebands, with the later technique sometimes called subcarrier modulation ("SCM"). There are many variations of modulators. Examples of dual path modulators are described in U.S. Pat. No. 5,745,273.

SCM techniques, such as those described in U.S. Pat. Nos. 4,989,200, 5,432,632, and 5,596,436, generally produce a modulated optical signal in the form of two mirror image sidebands at wavelengths symmetrically disposed around the carrier wavelength. Generally, only one of the mirror images is required to carry the signal and the other image is a source of signal noise that also consumes wavelength bandwidth that would normally be available to carry information. Similarly, the carrier wavelength, which does not carry information in an SCM system, can be a source of noise that interferes with the sub-carrier signal. Modified SCM techniques have been developed to eliminate one of the mirror images and/or the carrier wavelength, such as described in U.S. Pat. Nos. 5,101,450 and 5,301,058.

Initially, modulated optical signals were spatially separated by placing each optical signal on a different fiber to provide space division multiplexing ("SDM") of the information in optical systems. As the demand for capacity grew, increasing numbers of information data streams were spaced in time, or time division multiplexed ("TDM"), on the single optical signal in the SDM system as a means to better use the available bandwidth. The continued growth in demand has spawned the use of wavelength division multiplexing ("WDM") to transport multiple optical signals on a single fiber. In WDM systems, further increases in transmission capacity can be achieved not only by increasing the transmission rate of the information on each wavelength, but also by increasing the number of wavelengths, or channels, in the system.

There are two general options for increasing the channel count in WDM systems. The first option is to widen the transmission bandwidth to add more channels at present channel spacings. The second option is to decrease the spacing between the channels to provide a greater number of channels within a given transmission bandwidth. The first option currently provides only limited benefit because most optical systems use erbium doped fiber amplifiers ("EDFAs") to amplify the optical signal during transmission, and EDFAs have a limited bandwidth of operation and suffer from non-linear amplifier characteristics within the bandwidth. Difficulties with the second option include controlling the wavelengths of WDM optical signals and/or controlling the optical sources to prevent interference from wavelength drift and nonlinear interactions between the signals.

A further difficulty in WDM systems is that chromatic dispersion, which results from differences in the speed at which different wavelengths travel in optical fiber, can also degrade the optical signal. Chromatic dispersion is typically controlled using one or more of three techniques. One technique is to offset the dispersion of the different wavelengths in the transmission fiber through the use of optical components such as Bragg gratings or arrayed waveguides that vary the relative optical paths of the wavelengths. Another technique is to intersperse different types of fibers that have opposite dispersion characteristics to that of the transmission fiber. A third technique is to attempt to offset the dispersion by prechirping the frequency or modulating the phase of the carrier source in addition to modulating the data onto the carrier. For example, see U.S. Pat. Nos. 5,555,118, 5,778,128, 5,781,673 or 5,787,211. These techniques require that additional components be added to the system and/or the use of specialty optical fiber that has to be specifically tailored to each length of transmission fiber in the system.

New fiber designs have been developed that substantially reduce the chromatic dispersion of WDM signals during transmission in the 1550 nm wavelength range, such as dispersion shifted fiber and non-zero dispersion shifted fiber. However, the decreased dispersion of the optical signal allows for increased nonlinear interaction between channels, such as four wave mixing, which increases signal degradation. The effect of lower dispersion on nonlinear signal degradation becomes more pronounced at increased transmission rates due to the higher signal launch power used at higher transmission rates.

Non-linear interactions can be reduced if adjacent data signals are linearly polarized and oriented orthogonal to each other. For example, see U.S. Pat. No. 5,111,322, issued on May 5, 1992. Such systems, however, still have certain drawbacks, such as requiring two modulators to produce a pair of orthogonal signals. As a result, the size, cost, and power consumption of such systems will increase significantly as the number of WDM channels increase. Accordingly, there is a need to reduce the number of components in optical systems, particularly expensive components such as modulators, while at the same time reducing the effects of phenomena, such as chromatic dispersion and non-linear interactions.

The many difficulties associated with increasing the number of wavelength channels in WDM systems, as well as increasing the transmission bit rate have slowed the continued advance in communications transmission capacity. In view of these difficulties, there is a clear need for transmission techniques and systems that provide for higher capacity, lower cost, longer distance optical communication systems, devices, and methods.

BRIEF SUMMARY OF THE INVENTION

The systems, devices, and methods of the present invention address the above-stated need for higher capacity, longer distance optical communications systems, devices, and methods by producing orthogonal optical data signals. The present invention can be employed, for example, in multi-dimensional optical networks, point to point optical networks, or other devices or systems which can benefit from the improved performance afforded by the present invention.

One embodiment of the present invention is an optical transmitter, including an optical source, a four port polarization splitter/coupler having a first port connected to the optical source, having a second port for outputting optical data signals, and having third and fourth ports, first and second polarization converters, each having a first port connected to the third and fourth ports of the splitter/combiner, respectively, and each having a second port, and a modulator having first and second optical ports respectively connected to the second ports of the polarization converters, and having a plurality of electrical input terminals.

Another embodiment of the present invention is an optical transmitter, including an optical source for producing an optical carrier, a circulator having a first port connected to the optical source, and having second and third ports, a splitter/combiner having a first port connected to the second port of the circulator, and having second and third ports, an electrical carrier source, first and second electrical modulators, each having a carrier input connected to the electrical carrier source, each having a data input, and each having an output, a signal conditioner having first and second inputs connected to the outputs of the first and second electrical modulators, and having first and second outputs, and an optical modulator having first and second optical ports respectively connected to the second and third ports of the splitter/combiner, and having first and second electrical inputs connected to the first and second outputs of the signal conditioner, and wherein the optical modulator modulates electrical data signals onto subcarriers of the optical carrier, and wherein the subcarriers of the optical carrier are combined to have different polarization orientations when they exit the transmitter through the splitter/combiner.

Another embodiment of the present invention is an optical transmitter which includes an optical source, a circulator having a first port connected to the optical source and having second and third ports, a polarization beam splitter/combiner having a first port connected to the second port of the circulator and having second and third ports, and an modulator having first and second optical ports respectively connected to the second and third ports of the polarization beam splitter/combiner, and having a plurality of electrical input terminals.

Another embodiment of the present invention is an optical transmitter including an optical source, a circulator having a first port connected to the optical source and having second and third ports, a polarization beam splitter/combiner having a first port connected to the second port of the circulator and having second and third ports, an modulator having first and second optical ports respectively connected to the second and third ports of the polarization beam splitter/combiner and having a plurality of electrical input terminals, an electrical carrier source, and first and second electrical modulators each having a carrier input connected to the electrical carrier source and each having a data input and each having an output connected to one of the plurality of electrical input terminals of the modulator.

Another embodiment of the present invention is an optical modulator which includes a circulator having first, second, and third ports, a polarization beam splitter/combiner having a first port connected to the second port of the circulator and having second and third ports, and an modulator having first and second optical ports respectively connected to the second and third ports of the polarization beam splitter/combiner, and having a plurality of electrical input terminals.

Another embodiment of the present invention is a method of transmitting optical signals, including producing an optical carrier, splitting the optical carrier into first and second optical carrier components, passing the optical carrier components in opposite directions through a modulator, converting a first electrical data signal into a corresponding first optical data signal, converting a second electrical data signal into a corresponding second optical data signal, and combining the first and second optical data signals to form a combined optical data signal including first and second optical data signals with different polarization orientations.

Another embodiment of the present invention is a communications system which utilizes methods and apparatuses according to the teachings of the present invention, and can realize increased capacity and transmission distance by transmitting some or all of data traffic in an orthogonal format.

Those and other embodiments of the present invention will be described in the following detailed description. The present invention addresses the needs described above in the description of the background of the invention by providing improved systems, apparatuses, and methods. These advantages and others will become apparent from the following detailed description.

BRIEF DESCRIPTION OF THE DRAWINGS

Embodiments of the present invention will now be described, by way of example only, with reference to the accompanying drawings, wherein.

DETAILED DESCRIPTION OF THE INVENTION

Figure 1:
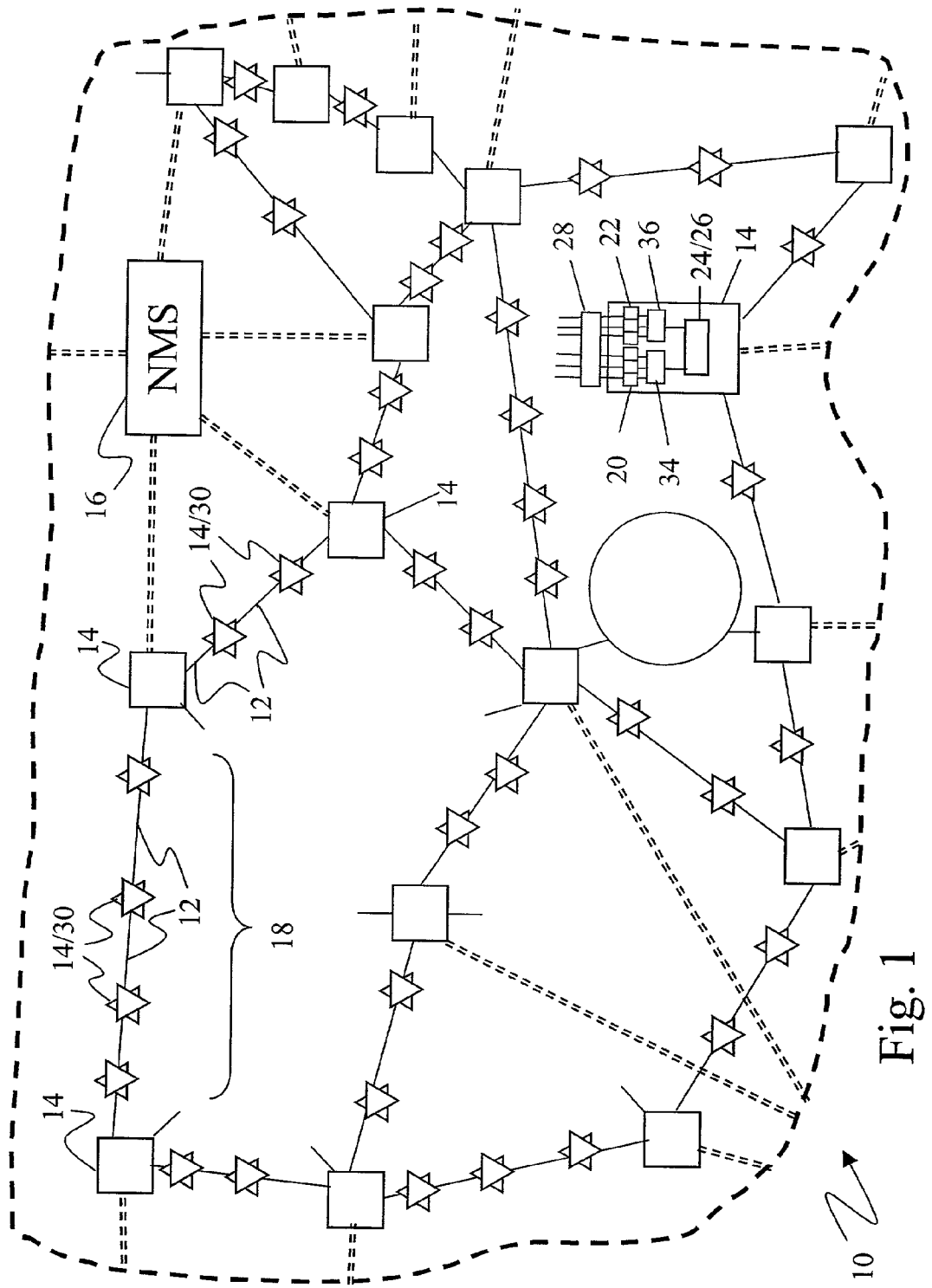
FIGS. 1 and 2 illustrate examples optical communications systems.

FIG. 1 illustrates an optical communications system 10 which includes optical paths 12 connecting nodes and network elements 14. Advantages of the present invention can be realized with many system 10 configurations and architectures, such as an all optical network, one or more point to point links, one or more rings, a mesh, other architectures, or combinations of architectures. The system 10 illustrated in FIG. 1 is a multi-dimensional network, which can be implemented, for example, as an all optical mesh network, as a collection of point to point links, or as a combination of architectures. The system 10 can employ various signal formats, and can also convert between formats. The system 10 can also include more or less features than those illustrated herein, such as by including or deleting a network management system ("NMS") 16 and changing the number, location, content, configuration, and connection of nodes 14.

The optical paths 12 can include guided and unguided transmission media, such as one or more optical fibers, ribbon fibers, planar devices, and free space devices, and can interconnect the nodes 14 providing optical communication paths through the system 10. Various types of transmission media can be used, such as dispersion shifted fiber ("DSF"), non-dispersion shifted fiber ("NDSF"), non-zero dispersion shifted fiber ("NDSF"), dispersion compensating fiber ("DCF"), polarization maintaining fiber ("PMF"), single mode fiber ("SMF"), multimode fiber ("MMF"), other types of transmission media, and combinations of transmission media. Furthermore, the transmission media can be doped, such as with erbium, germanium, neodymium, praseodymium, ytterbium, other rare earth elements, other dopants, and mixtures thereof. The paths 12 can carry one or more uni- or bi-directionally propagating optical signal channels or wavelengths. The optical signal channels can be treated individually or as a single group, or they can be organized into two or more wavebands or spectral groups, each containing one or more optical signal channel. One or more paths 12 can be provided between nodes 14 and can be connected to protection switching devices and/or other redundancy systems. The optical path 12 between adjacent nodes 14 is typically referred to as a link 18, and the optical path 12 between adjacent components along a link 18 is typically referred to as a span.

The nodes and network elements 14 can include one or more signal processing devices including one or more of various optical and/or electrical components. The nodes and network elements 14 can perform network functions or processes, such as switching, routing, amplifying, multiplexing, combining, demultiplexing, distributing, or otherwise processing optical signals. For example, nodes and network elements 14 can include one or more transmitters 20, receivers 22, switches 24, add/drop multiplexers 26, amplifiers 30, interfacial devices 28, multiplexers/combiners 34, and demultiplexers/distributors 36, as well as filters, dispersion compensating and shifting devices, monitors, couplers, splitters, and other devices. One embodiment of one node 14 is illustrated in FIG. 1, although the nodes 14 can have many other variations and embodiments. Additional examples of nodes 14 are described in U.S. patent application Ser. No. 09/817,478, filed Mar. 26, 2001, and U.S. Pat. No. 6,344,922, issued Feb. 15, 2002, both of which are incorporated herein by reference.

The NMS 16 can manage, configure, and control nodes 14 and can include multiple management layers that can be directly and indirectly connected to the nodes and network elements 14. The NMS 16 can be directly connected to some nodes and network elements 14 via a data communication network (shown in broken lines) and indirectly connected to other nodes and network elements 14 via a combination of a directly connected node and communications paths in the optical system 10. The data communication network can, for example, be a dedicated network, a shared network, or a combination thereof. A data communications network utilizing a shared network can include, for example, dial-up connections to the nodes and network elements 14 through a public telephone system. The NMS 16 can reside at one or more centralized locations and/or can be distributed among components in the system 10. Mixed data or supervisory channels can be used to provide connections between the network elements of the NMS 16, which can be located in, or remote from, nodes and network elements 14. The supervisory channels can be transmitted within and/or outside the signal wavelength band and on the same medium or a different medium than the wavelength band. Examples of an NMS 16 are described in U.S. patent application Ser. No. 60/177,625, filed Jan. 24, 2000, and PCT Patent Application PCT/US01/02320, filed Jan. 24, 2001, both of which are incorporated herein by reference.

The transmitters 20 and receivers 22 are configured respectively to transmit and receive optical signals including one or more information carrying optical signal wavelengths, or channels, via the optical paths 12. The transmitters 20 and receivers 22 can be used in multiple and single channel systems, and can provide varying reach (e.g., short, intermediate, and long reach). The transmitters 20 and receivers 22 can also be part of a device that includes standardized interface transmitters and receivers, such as to support interoperability with other devices and systems, which is particularly useful in WDM applications.

The transmitters 20 include an optical source that provides an optical carrier and can utilize, for example, coherent or incoherent sources, and narrow band or broad band sources, such as distributed feedback ("DFB") sources, distributed Bragg reflection ("DBR") sources, sliced spectrum sources, fiber lasers, semiconductor lasers, light emitting diodes, and other optical sources. The transmitters 20 often include a narrow bandwidth laser as the optical source. The transmitter 20 can impart information onto the optical carrier or onto one or more subcarriers or sidebands. Typically, information is imparted by directly modulating the optical source, by externally modulating the optical carrier, or by modulating the information onto one or more subcarriers or sidebands of the optical carrier, with the later sometimes called sub-carrier modulation ("SCM"). The transmitter 20 may utilize one or more types of modulators, such as electro-optic (e.g., lithium niobate), electro-absorptive, etc.

The receiver 22 can include various detection techniques, such as coherent detection, optical filtering and direct detection, as well as other techniques and combinations thereof. The receiver 22 can include filters, such as fiber Bragg grating filters, bulk grating filters, or other types of filters, or filtering can be performed outside of the receiver 22.

The transmitters 20 and receivers 22 can utilize one or more formats to transmit and receive optical signals. For example, modulation formats such as amplitude modulation, frequency modulation, phase modulation, polarization modulation, power modulation, other modulation formats and combinations of formats, such as quadrature amplitude modulation, can be used. Also, return to zero ("RZ") or non-return to zero ("NRZ") formats can be used with various modulation techniques. Different encoding formats can also be used, such as differential encoding, duobinary encoding, other encoding formats, and combinations thereof. One or more multiplexing formats can be employed, such as space, time, code, frequency, phase, polarization, wavelength, other types, and combinations thereof. The format can also include one or more protocols, such as SONET/SDH, IP, ATM, Digital Wrapper, GMPLS, Fiber Channel, Ethernet, etc. Other signal formats, such as soliton, pulse, chirp, etc, can also be used. Transmitters 20 and receivers 22 can utilize the same format for all channels throughout the system 10, or different formats can be used for different channels and/or in different parts of the system 10, with appropriate format conversion being performed by the transmitters 20 and receivers 22 or by other devices. Examples of optical transmitters 20 are described in U.S. Pat. No. 6,118,566, issued Sep. 12, 2000, which is incorporated herein by reference.

Tunable transmitters 20 and receivers 22 can be used, such as to provide flexibility in the selection of wavelengths used in the system 10. The transmitters 20 and receivers 22 can also include or be associated with other components to perform other signal processing, such as reshaping, retiming, error correction, protocol processing, pre-emphasis, and optical and/or electrical pre- and post-dispersion and distortion compensation. For example, receivers 22 can be connected to the transmitters 20 in back to back configuration as a transponder or regenerator. The regenerator can be deployed as a 1R, 2R, or 3R regenerator, depending upon whether it serves as a repeater (R1: repeat), a remodulator (R2: reshape & repeat), or a full regenerator (R3: reshape, retime, repeat), respectively. The transmitters 20 and receivers 22 in a WDM system can be operated in a uniform manner or the transmission and reception characteristics of the signal channels can be tailored individually and/or in groups.

The switches 24 can take many forms and can have different levels of "granularity". "Granularity" refers to the resolution or precision with which the switching is performed. For example, WDM switches 24 can switch individual wavelengths (also called "channels"), groups of wavelengths, or portions of wavelengths. Before being switched, the signals can be demultiplexed into the appropriate level of granularity, and after being switched the signals can be multiplexed into the desired format, using the same or different modulation formats, wavelengths, or other characteristics.

Switches 24 can have electrical, optical, or electrical/optical switch "fabrics". The switch "fabric" refers to the technology used to perform the switching. Switches 24 having an electrical fabric convert incoming optical signals into electrical signals, the electrical signals are switched with electronic equipment, and the switched electrical signals are converted back into optical signals. Such switching is often referred to as "O-E-O" ("optical-electrical-optical") switching. In contrast, switches 24 having an optical switch fabric perform the switching with the signals in the optical domain. However, switches 24 having an optical switch fabric can still perform O-E-O conversions, such as when demultiplexing or multiplexing optical signals, or in other related interface devices or operations.

There are many optical switch fabrics, some of which use micro-electromechanical systems ("MEMS"), such as small, electrically-controlled mirrors, to selectively reflect an incoming optical signal to a desired output. Other optical switch fabrics use a variable index of refraction device to controllably change the index of refraction of an optical signal path, such as by forming a gas pocket in an optically transparent liquid medium, in order to change the direction of the optical signal. Yet another example of an optical switch fabric is the use of an optical path in which the optical gain and/or loss can be controlled so that an optical signal can be either passed or blocked. Some examples of switches 24 having an optical fabric are described in U.S. patent application Ser. Nos. 09/119,562, filed Jul. 21, 1998, and 10/090,015, filed Feb. 22, 2002, and PCT Patent Application PCT/US00/23051, filed Aug. 23, 2000, all of which are incorporated herein by reference.

Switches 24 can be grouped into two categories: integrated switches and interfacial switches. Integrated switches allow for optical continuity of signals, while interfacial switches introduce an optical discontinuity which interrupts optical signals with one or more O-E-O conversion, either in the switch itself or in a related component such as a multiplexer 34, demultiplexer 36, or other interface device. In contrast, integrated switches are optically integrated into the system 10 and allow optical signals to continue through the system 10, via the integrated switch 24, without an O-E-O conversion or optical discontinuity. Integrated switches 24 are sometimes called "all-optical switches", "O-O" switches, or "O-O-O" switches. Interfacial switches 24 are a type of interfacial device 28, which is discussed in more detail hereinbelow. Interfacial switches are located within or at the periphery of networks 10 and point to point links 18, such as between two or more point to point links 18, between two or more networks 10, or between a network 10 and a point to point link 18. A switch 24 can have both an integrated switch 24 portion and a interfacial switch 24 portion, such that some signals are switched without an O-E-O conversion, while other signals are subjected to an O-E-O conversion.

Switches 24 can have many forms and variations. For example, in addition to being integrated or dedicated, and having an optical and/or electrical switch fabric, a switch 24 can be polarization-sensitive or polarization-insensitive. As discussed hereinbelow in more detail, the present invention can produce a pair of optical signals which have orthogonal polarization and which occupy the same optical frequency range. A switch 24 which is polarization sensitive can switch those signals separately, possible sending them to different destinations. A polarization-insensitive switch 24 can also be used with such signals, but the pair of signals will be switched together such that both are switched to the same destination. For example, an integrated, polarization-insensitive switch 24 might filter the optical frequency range containing the orthogonally polarized pair of signals, and switch that filtered signal using an optical switch fabric, without regard to whether it contains a single signal or a pair of orthogonally polarized signals.

Add/drop multiplexers 26 and other devices can function in a manner analogous to integrated switches 24 so that, in general, only optical signals which are being "dropped" from the network 10 are converted into electronic form. The remaining signals, which are continuing through the network 10, remain in the optical domain. As a result, optical signals in an all-optical system 10 (e.g., systems 10 having integrated switches 24 and integrated add/drop multiplexers 26) are not converted into electrical form until they reach their destination, or until the signals degrade to the point they need to be regenerated before further transmission of course, add/drop multiplexers 26 can also be interfacial devices 28.

Interfacial devices 28 generally act as interfaces to and between optical networks 10 and/or point to point links 18. Interfacial devices 28 typically perform at least one optical-to-electrical ("O-E") or electrical-to-optical ("E-O") conversion. In the case of an interfacial switch 24, for example, signals are subjected to an O-E-O conversion before proceeding to the next link 18 or network 10. Interfacial devices 28 can, for example, act as an interface between electrical and optical systems or devices, between different formats, or at other interfaces. Interfacial device 28 can be located within or at the periphery of networks 10, such as between two or more networks 10, between two or more point to point links 18, and between networks 10 and point to point links 18. Interfacial devices 28 can include, for example, cross-connect switches, IP routers, ATM switches, etc., and can have electrical, optical, or a combination of switch fabrics. Interfacial devices 28 can provide interface flexibility and can be configured to receive, convert, and provide information in one or more various formats, protocols, encoding schemes, and bit rates to the transmitters 20, receivers 22, and other devices. The interfacial devices 28 also can be used to provide other functions, such as protection switching.

The optical amplifiers 30 can be used to provide signal gain, such as to overcome attenuation, and can be deployed proximate to other optical components, such as in nodes 14, as well as along the optical communications paths 12. The optical amplifiers 30 can include concentrated/lumped amplification and/or distributed amplification, and can include one or more stages. The optical amplifier can include, for example, doped (e.g. erbium, neodymium, praseodymium, ytterbium, other rare earth elements, other dopants, and mixtures thereof) and/or non-linear interaction amplifiers (e.g., Raman amplifiers, Brillouin amplifiers, etc.), and can be locally and/or remotely pumped with optical energy. The optical amplifiers 30 can also include other types of amplifiers 30, such as semiconductor amplifiers.

Optical combiners 34 can be used to combine the multiple signal channels into WDM optical signals for the transmitters 20. Likewise, optical distributors 36 can be provided to distribute the optical signal to the receivers 22. The optical combiners 34 and distributors 36 can include various multi-port devices, such as wavelength selective and non-selective ("passive") devices, fiber and free space devices, and polarization sensitive devices. Other examples of multi-port devices include circulators, passive, WDM, and polarization couplers/splitters, dichroic devices, prisms, diffraction gratings, arrayed waveguides, etc. The multi-port devices can be used alone or in various combinations with various tunable or fixed wavelength transmissive or reflective, narrow or broad band filters, such as Bragg gratings, Fabry-Perot and dichroic filters, etc. in the optical combiners 34 and distributors 36. Furthermore, the combiners 34 and distributors 36 can include one or more serial or parallel stages incorporating various multi-port device and filter combinations to multiplex, demultiplex, and/or broadcast signal wavelengths Xi in the optical systems 10.

Figure 2:
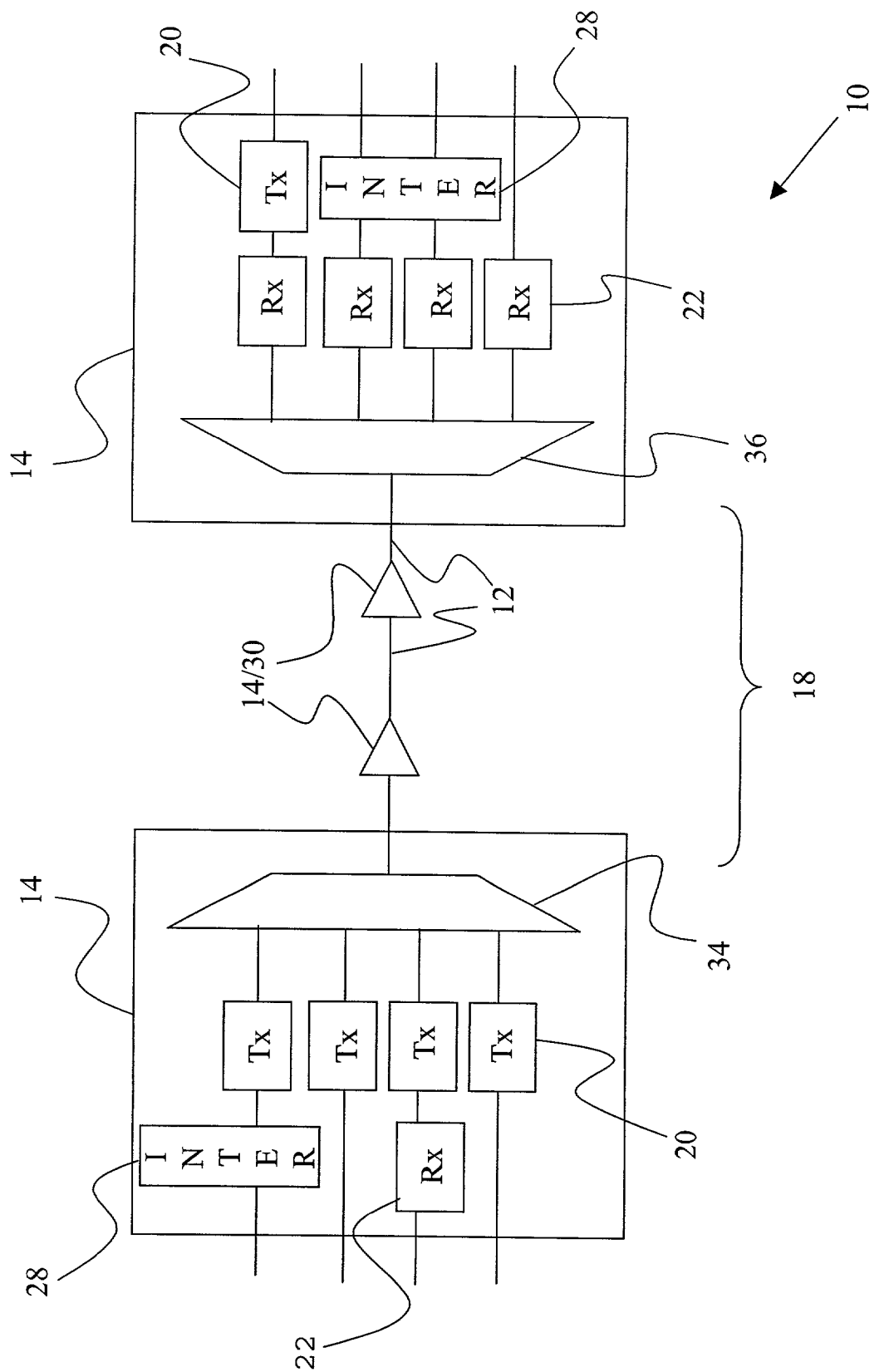

FIG. 2 illustrates another embodiment of the system 10 including a link 18. That system 10 can, for example, be all or part of a point to point system 10, or it may be part of a multi-dimensional, mesh, or other system 10. One or more of the nodes or network elements 14 can be connected directly to the network management system 16 (not shown). If the system 10 is part of a larger system, then as few as none of the nodes or network elements 14 can be connected to the network management system 16 and all of the nodes 14 can still be indirectly connected to the NMS 16 via another node or network element 14 in the larger system 10.

Figure 3:
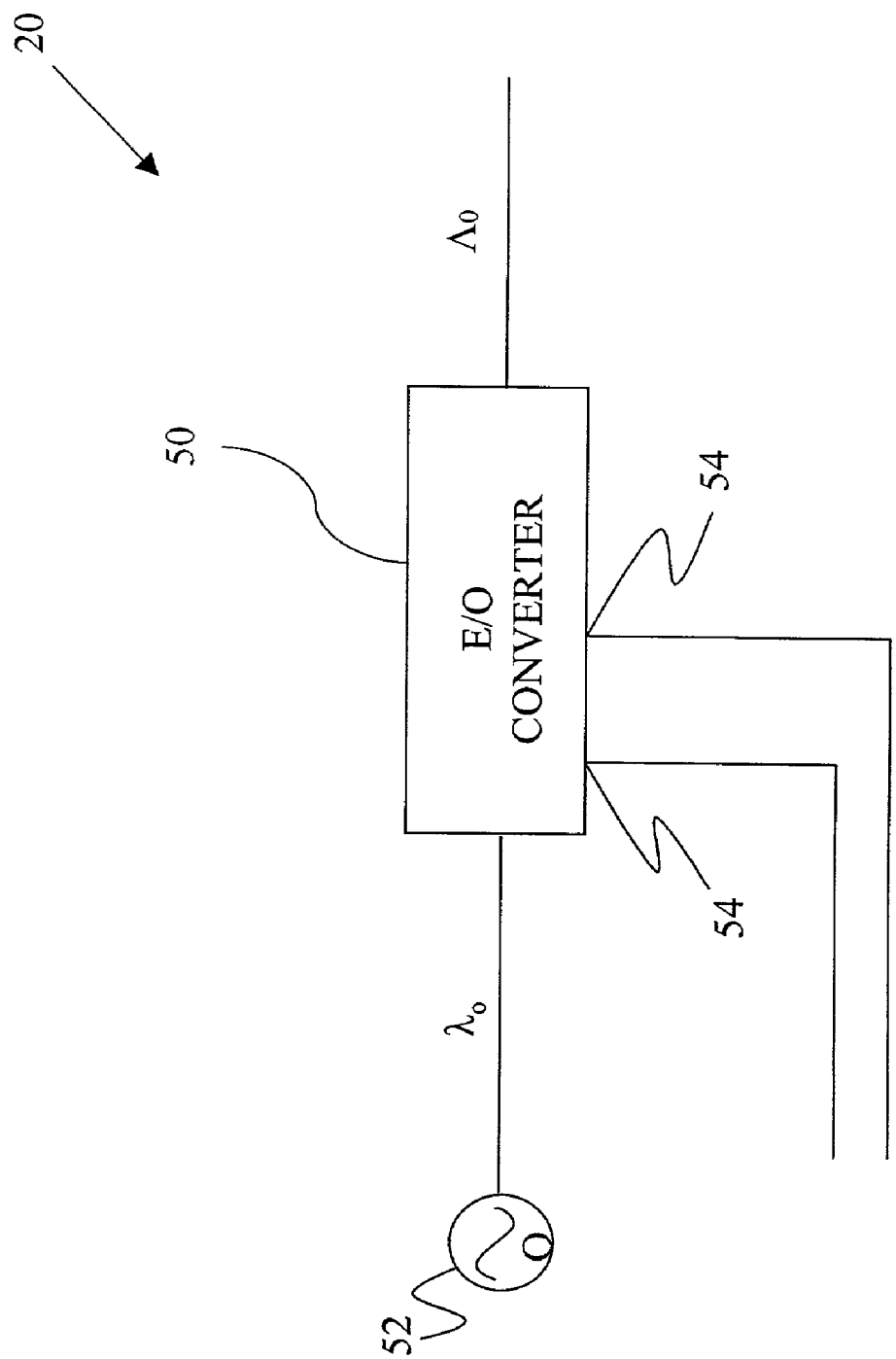
FIG. 3 illustrates an embodiment of a transmitter that can be used in the optical communications system.

FIG. 3 illustrates a transmitter 20 including an electrical-to-optical ("E/O") converter 50 and an optical source 52. The transmitter 20 can also include components other than those illustrated herein, such as phase shifters, isolators, filters, signal distorters, error correction devices, protocol processors, format converters, and other electrical, optical, and electro-optical components.

The E/O converter 50 receives an optical carrier $\lambda_O$ from the optical source 52 and receives electrical data signals at one or more data inputs 54. The O/E converter 50 converts the electrical data signals into optical data signals $\Lambda_o$. The E/O converter 50 can provide the data at the optical carrier frequency, or it can provide the data on one or more subcarriers, with the later sometimes referred to as "subcarrier modulation". For example, one or more baseband electrical data signals can be provided to the E/O converter 50 and modulated onto the optical carrier frequency, or one or more baseband electrical signals can be modulated onto one or more electrical carriers, with the resultant signal used by the E/O converter 50 to modulate the signals onto one or more subcarriers.

Figure 4:
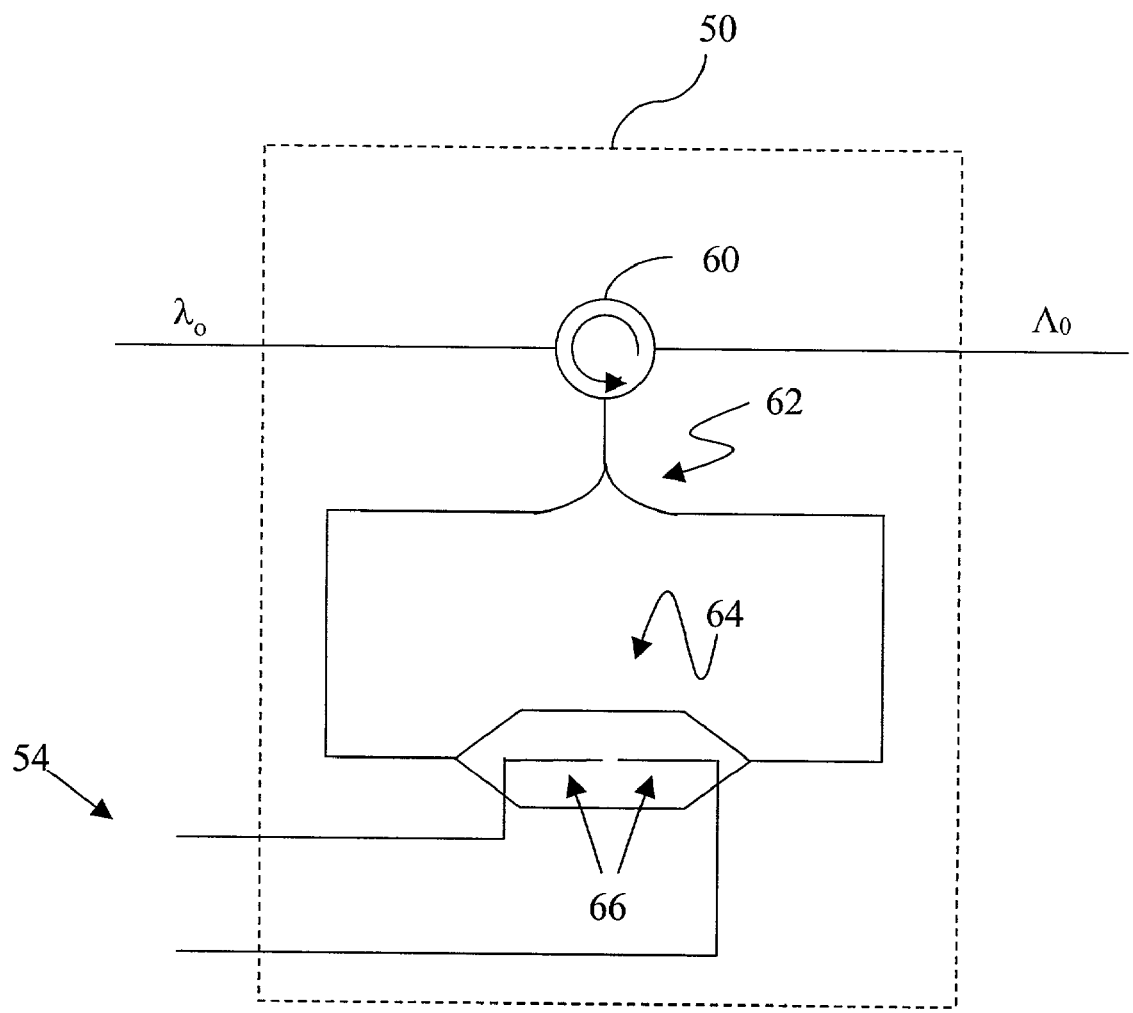
FIG. 4 illustrates an embodiment of an electrical to optical converter that can be used in the transmitter.

FIG. 4 illustrates an embodiment of an E/O converter 50 which produces orthogonally-polarized optical signals $\Lambda_O$. As used herein, the term "orthogonal" includes signals which are perfectly orthogonal, as well as those that are not perfectly orthogonal. Limitations in technology, variations in product specifications and tolerances, and other factors may prevent perfectly orthogonal signals from being produced. Nonetheless, advantages of the present invention can still be realized with non-ideal signals and devices, and such variations are within the scope of the term "orthogonal" as it is used herein. The present invention will be generally described in terms of producing orthogonally polarized signals, although the present invention may also be used to produce signals which are not orthogonally polarized. In some cases the signals may not be perfectly orthogonal by design, such as when a particular application does not require the full advantage of perfectly orthogonal signals. In other cases, signals may not be orthogonal in order to achieve other performance goals, such as by equally spacing more than two signals having different polarization orientations (e.g., three signals offset by 120 degrees). Furthermore, although the present invention will generally be described in terms of equally spaced polarization orientations, it is also possible to have unequal spacing between polarization orientations.

The E/O converter 50 includes a circulator 60, a splitter/combiner 62, and a modulator 64 in which electrical data signals travel in opposite directions on electrodes 66. Typically, the optical source 52 will produce an optically polarized carrier. The E/O converter 50 receives the optical carrier $\lambda_o$ which passes through the circulator 60 and the splitter/combiner 62. The split optical carrier is provided to opposite ends of the modulator 64 and travels through the modulator 64 in opposite directions. Each of the oppositely traveling optical carrier components is modulated by a corresponding one of the electrical data signals on electrodes 66. The modulated optical carrier components exit the modulator 64, are combined at the splitter/combiner 62, pass through the circulator 60, and exit the E/O converter 50. Signal degradation and interaction between the output signals $\Lambda_0$ is reduced because the signals are orthogonal to each other.

Some or all of the E/O converter 50 is made from polarization maintaining components, such as the circulator 60, the splitter/combiner 62, optical fiber or other connectors and paths within the E/O converter 50, etc. Furthermore, the electrodes 66 may be terminated with a resistor to ground, or in another fashion, as appropriate.

The splitter/combiner 62 splits and combines the optical carrier and modulated signals. The splitter/combiner 62 can be, for example, a polarization beam splitter/combiner. In one embodiment, polarized light from the optical carrier is incident at a 45 degree angle at the input of the polarization beam splitter/combiner so that the light is equally split into optical carrier components. In other embodiments, the splitter/combiner 62 can be a polarization maintaining splitter/combiner which can be used, for example, to split and combine polarized light. Other embodiments of splitters and combiners can also be used. Typically, splitters can be operated as combiners and vice versa. Some embodiments of the present invention utilize such dual functionality, while other embodiments operate with devices and components which perform only as splitters and devices and components which perform only as combiners. Typically, the optical carrier is split into equal components so that the resultant signals will be of equal strength. However, it is also possible to split the optical carrier into unequal components.

The modulator 64 may be or include one or more Mach-Zehnder modulators and may be used to modulate data onto the optical carrier $\lambda_o$, or to modulate data onto one or more subcarriers. The modulator 64 may be, for example, an interferometer, an upconverter, a downconvert, or a frequency shifter.

The modulator 64 modulates data onto the oppositely propagating optical carrier components with oppositely traveling electrical data signals carried by the electrodes 66. The optical carrier component traveling from left to right through the modulator 64 is modulated with a corresponding electrical data signal which travels through one of the electrodes 66 in the same direction (i.e., from left to right). Similarly, the optical carrier component traveling from right to left through the modulator 64 is modulated with an electrical data signal which travels from right to left through the other electrode 66. Accordingly, the same or different data signals can be simultaneously modulated with the same modulator 64 onto different optical carrier components, which travel in different directions through the modulator 64.

The modulator 64 is shown as being a single Mach-Zehnder modulator, with two traveling wave electrodes 66, each carrying an electrical data signal. However, many variations of the modulator 64 are possible. For example, the modulator 64 can include one or more parallel or serial Mach-Zehnder modulators 64 or other modulators 64, the modulator 64 can include a different number of electrodes 66, each electrode 66 can carry one or more electrical data signals, and the electrodes 66 can have different configurations. Some examples of possible variations are disclosed hereinbelow.

Figure 5:
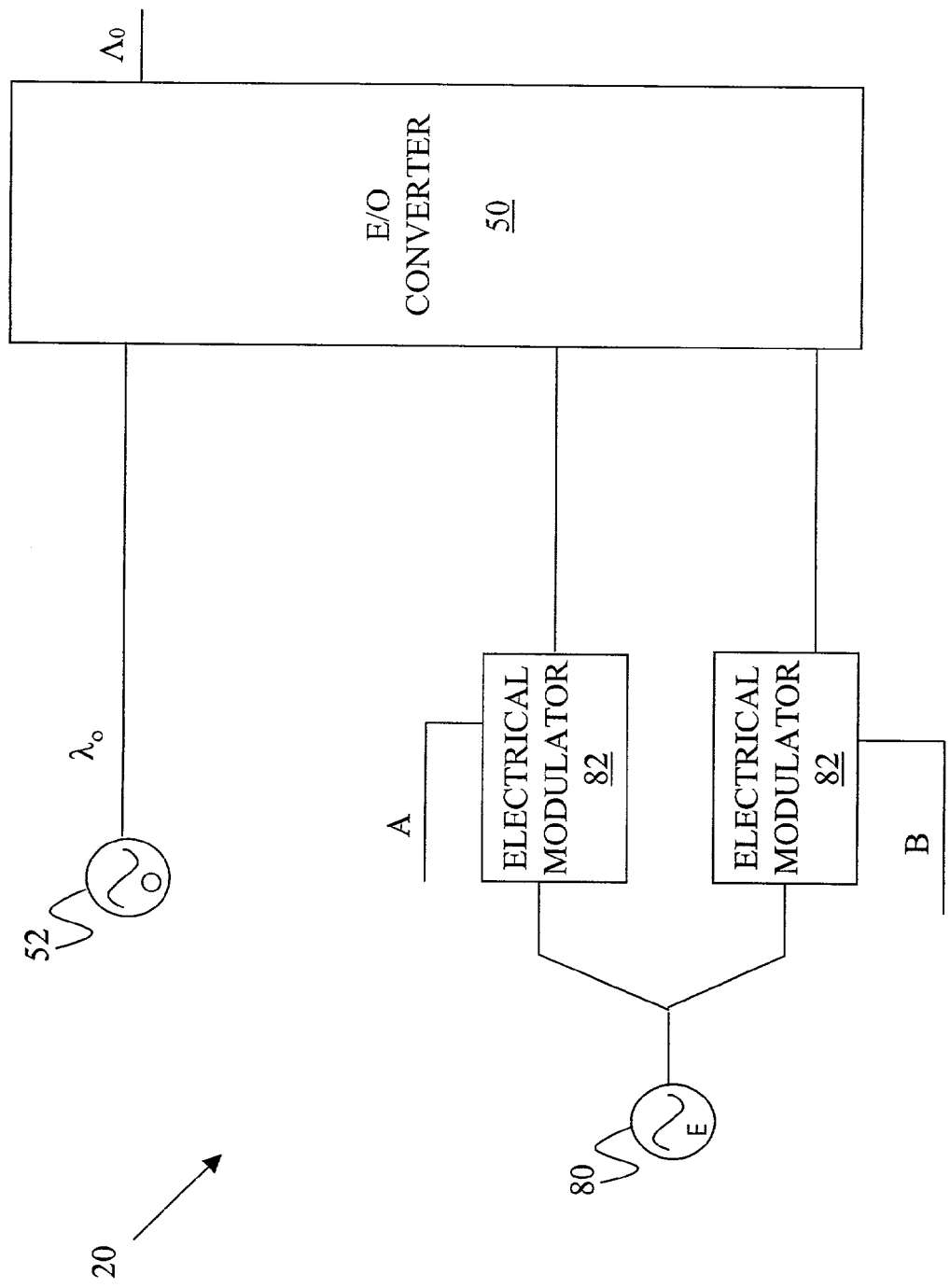
FIG. 5 illustrates another embodiment of a transmitter.

FIG. 5 illustrates a transmitter 20 which modulates baseband electrical data signals (A and B) onto subcarriers of the optical carrier $\lambda_o$. The transmitter 20 includes an electrical oscillator 80 producing an electrical carrier and electrical modulators 82 which modulate the baseband electrical data signals onto the electrical carrier.

The illustrated embodiment shows a single electrical carrier source 80 used by both electrical modulators 82, although the transmitter 20 can use more than one electrical carrier source 80. For example, separate electrical carrier sources 80 producing the same frequency electrical carrier can be used to produce orthogonal modulated optical signals $\Lambda_0$ at the same optical sideband frequencies.

In another embodiment, two or more electrical carrier sources 80 produce electrical carriers with different frequencies and the transmitter 20 produces orthogonal modulated optical signals $\Lambda_0$ at different optical subcarrier frequencies, such as to offset the orthogonal modulated optical signals $\Lambda_0$ from each other. Such an embodiment can be used, for example, to reduce unwanted interactions between closely spaced modulated optical signals or to facilitate in the separation of signals at the receiver 22.

The format of the modulated optical signals $\Lambda_0$ may affect the manner in which the signals $\Lambda_0$ are received and detected. For example, if a pair of orthogonal signals $\Lambda_0$ have the same frequency, the receiver 22 might need to be polarization sensitive, such as by splitting the polarization components and detecting each separately, or by having a sensor that is sensitive to the different polarizations of the signals $\Lambda_0$. In contrast, orthogonal signals $\Lambda_0$ which are at different frequencies could, for example, be detected with polarization insensitive receivers 22 using, for example, frequency selective filters to separate the signals. In addition, orthogonal signals which are offset from each other gain additional benefits from the frequency separation.

The E/O converter 50 can include, for example, a single Mach-Zehnder modulator 64, such as that illustrated in FIG. 4, or other modulators 64, or other devices for imparting the data onto the optical carrier $\lambda_o$, such as those illustrated hereinbelow. The E/O converter 50 can produce orthogonal optical signals $\Lambda_0$, which are offset from the optical carrier $\lambda_o$ by the frequency of the electrical carrier.

In another embodiment, the electrical oscillator 80 and electrical modulations 82 may be replaced by encoders, such as Manchester encoders, which encode the baseband electrical data signals to facilitate subcarrier modulation. Other encoders and encoding schemes may also be used with the present invention to facilitate subcarrier modulation of the baseband electrical data signals.

Figure 6:
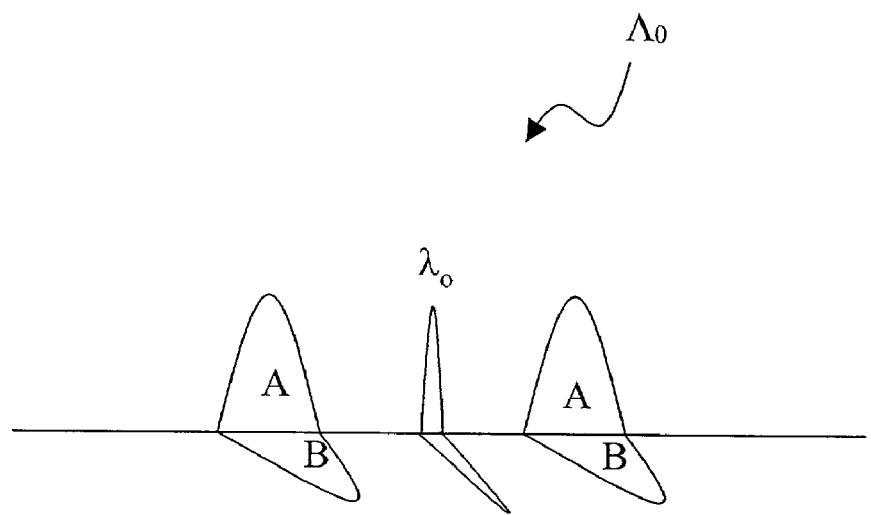
FIGS. 6 and 7 illustrate examples of signal profiles that can be generated by the transmitters.

FIG. 6 illustrates an example of optical signals $\Lambda_0$ (depicted in the frequency domain) that can be produced by the transmitter 20 illustrated in FIG. 5. That example illustrates double sideband, orthogonally polarized optical signals $\Lambda_0$ with the optical carrier $\lambda_o$ not suppressed. The signals $\Lambda_0$ include two orthogonal pairs of signals, with each orthogonal pair including an optical signal indicative of one of the electrical data signals (e.g., "A"), and the other indicative of the other electrical data signal (e.g., "B"). Because the signals are orthogonal to each other, two signals can be placed in the frequency space of a single signal without the signals destroying each other. Two orthogonal pairs are illustrated in this example, although in other embodiments only one orthogonal pair may be produced. Also, the optical carrier $\lambda_0$ is not suppressed in this example, so it is also present as an orthogonal pair. In other embodiments, the optical carrier $\lambda_0$ can be suppressed.

Many other variations are also possible with the present invention. For example, the optical carrier $\lambda_0$ can be suppressed, single sideband optical signals can be produced, and more or less optical signals than those illustrated herein can be produced. In addition, the orthogonal pairs do not have to be at the same frequency, but rather they can be offset from each other. Also, the optical signals do not have to be symmetrical about the optical carrier $\lambda_0$. Furthermore, optical signals do not need to be produced in orthogonal pairs. For example, only one signal in a pair may be produced, such as in a case where the other signal in the orthogonal pair is provided by another transmitter or not provided at all. Alternatively, signal pairs do not need to be orthogonal or in pairs, but may be of other polarization orientations and may be produced in groups other than two, and polarization orientations may be the same or different between signal pairs produced by a transmitter 20.

Figure 7:
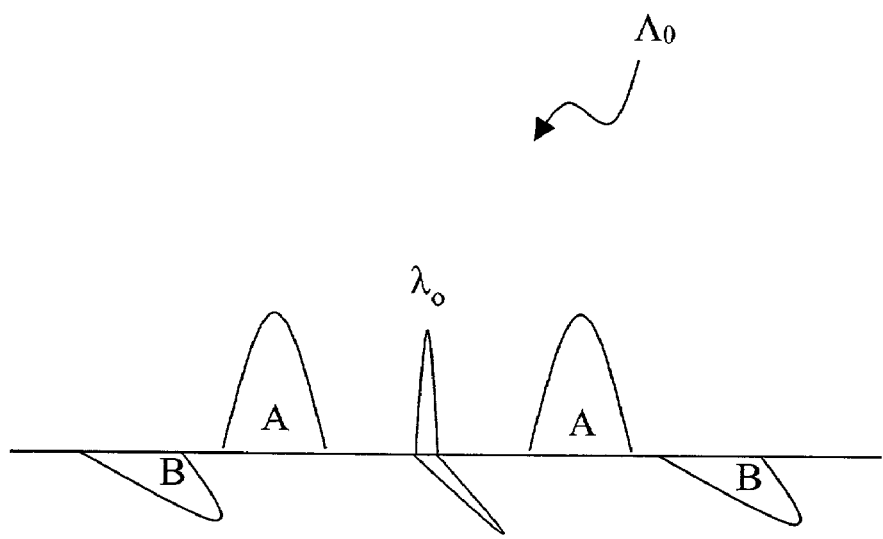

FIG. 7 illustrates an example of orthogonal optical signals $\Lambda_0$ in which the orthogonal pairs are offset from each other, such as to provide additional signal isolation. Such signals can be produced, for example, with the transmitter 20 of FIG. 5 except with separate electrical carrier sources 80, each producing an electrical carrier having a different frequency. The difference in the frequencies will determine the frequency offset between the signals in each orthogonal pair.

In addition to producing signal pairs in which each signal carries a different data stream, the present invention may be used to produce other types of signals. For example, an orthogonal signal pair may be used to produce a polarization modulated signal. In that example, one polarization orientation (e.g., vertical polarization) represents one binary value, and another polarization orientation (e.g., horizontal) represents the other binary value, and the electrical data signals are controlled so that the appropriate polarization orientation is produced to generate a polarization modulated signal. The different polarization values do not need to be orthogonal to each other, and polarization modulation may have more than two values (e.g., a tertiary system wherein each of the three values are represented by polarization orientations that are offset by 120 degrees from each other).

In another example, a signal is interleaved between two or more signals. For example, a high bit rate signal may be converted into two or more lower bit rate signals, and each lower bit rate signal may be transmitted on a different polarization orientated signal. Alternatively, the lower bit rate signals may be interleaved onto signals at different wavelengths, or on a combination of different wavelengths and different polarization orientations.

In another example, the polarization orientation of signals may be controlled or varied, such as by controlling or varying the relative phase of electrical data signals. For example, launch polarization may be adaptively controlled in order to simplify or improve reception of the signal. Such a system may include feedback, from the receiver 22 or from some intermediate point, to the transmitter 20 so that adjustments to the polarization may be made. That implementation may alleviate the need to polarization aligners which are often used to allow for the polarization effects of transmission. In another example, the polarization orientation of signals may be adjusted to facilitate reception in a heterodyne or self-heterodyne system, in which a local laser is polarization aligned with the incoming signal at the receiver 22. Polarization adjustment may be done on individual channels or subcarriers, or it may be done in groups of channels or subcarriers.

Figure 8:
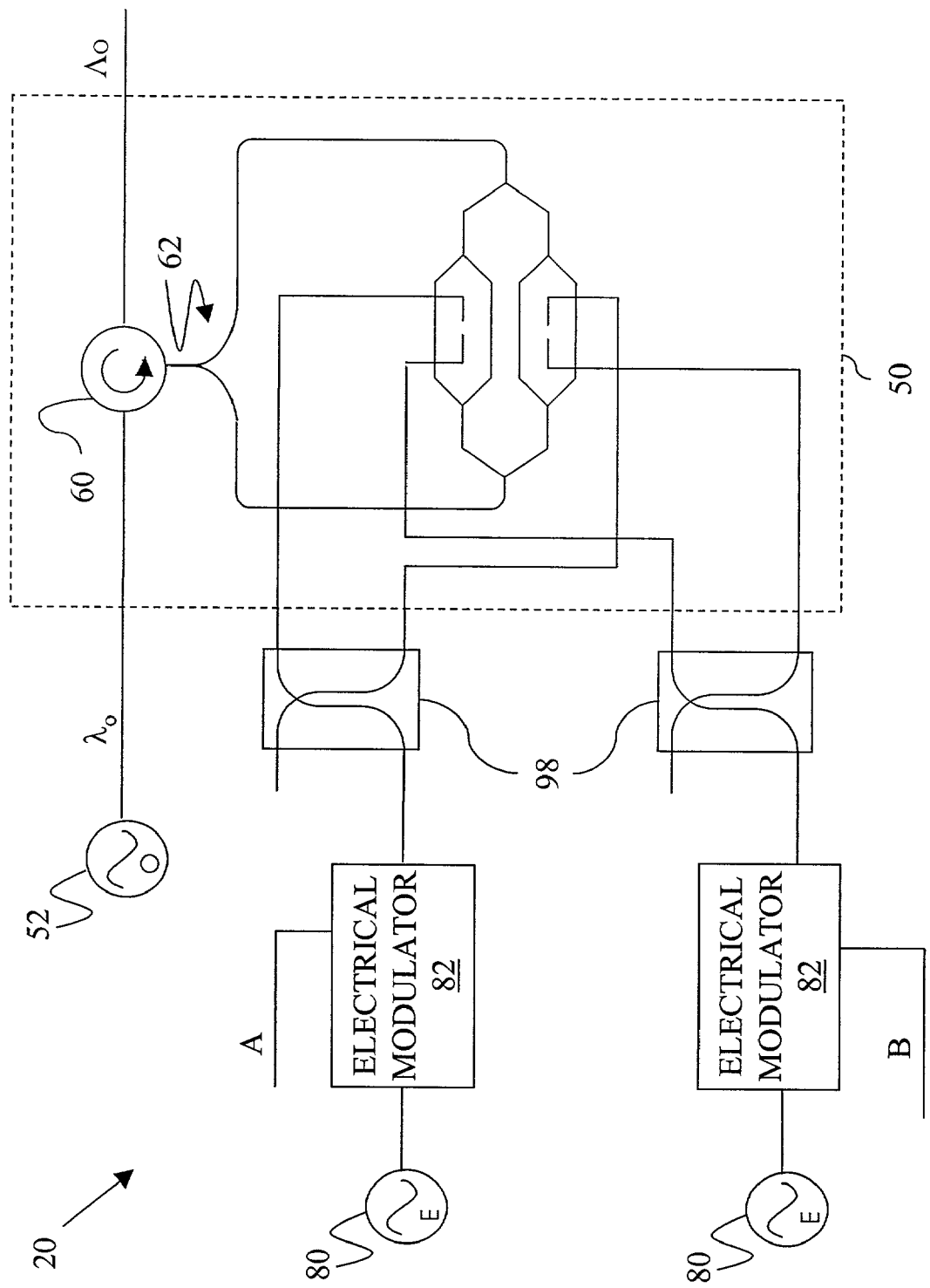
FIG. 8 illustrates another embodiment of a transmitter.

FIG. 8 illustrates another embodiment of the transmitter 20 in which a signal conditioner 98 is used. The signal conditioner 98 can couple, phase shift, provide electronic signal distortion, or otherwise condition one or more data signals. For example, the signal conditioner 98 can couple and phase shift the data signals so that a desired optical signal format is realized, such as single sideband and/or suppressed carrier, or so that the E/O converter 50 can be simplified by the removal of one or more phase shifters, couplers, input electrodes 66, or other components. The signal conditioner 98 is shown as operating on modulated electrical data signals, although the conditioner 98 can also operate on other signals, such as baseband signals.

The signal conditioner 98 can be a two-by-two, ninety degree electrical coupler, sometimes called a quadrature hybrid coupler, such that the first output produces a signal indicative of a combination of the signal at the second input plus a ninety degree phase shifted form of the signal at the first input, and the second output produces a signal indicative of a combination of the signal at the first input plus a ninety degree phase shifted form of the signal at the second input. Other variations of the electrical conditioner 98 are also possible. For example, the signal conditioner 98 can be an electrical coupler having different numbers of inputs and outputs and inducing different phase shifts. The signal conditioner 98 can be eliminated from the transmitter 20, such as if conditioning functions are not desired, or if the functions are performed by other components, such as the E/O converter 50 and electrical modulator 82.

In yet another embodiment, data signals A and B can be modulated onto different sideband frequencies. For example, one data signal can be modulated onto an upper sideband, and another signal can be modulated onto an orthogonal lower sideband. Similar results can be achieved with multiple electrical carrier sources 80 at different frequencies.

The transmitter 20 is shown as having an E/O converter 50 including a double parallel Mach-Zehnder modulator 64. That embodiment can be used, for example, to modulate data signals onto the optical carrier $\lambda_0$ and/or to modulate the data signals onto one or more sidebands of the optical carrier $\lambda_0$. For example, one or more data signals can be modulated onto single or double sidebands, with or without carrier suppression. The transmitter 20 illustrated in FIG. 8 has two electrical modulators 82 and two corresponding data signals, although more or less data signals and electrical modulators 82 may be included. In one embodiment, four data signals are subcarrier modulated, each signal onto a single sideband, with two orthogonally polarized signals at one frequency, and two additional orthogonally polarized signals at another frequency. In another embodiment, one or more signals can be subcarrier modulated and one or more signals can be modulated at the carrier frequency or at different frequencies. Other variations are also possible. The E/O converter 50 in the illustrated embodiment may be used with other embodiments of the invention, and other E/O converters 50 can be used in place of the one shown.

Typically, the connections between the outputs of the signal conditioners 98, or other devices in the transmitter 20, and the electrodes 66 in the E/O converter 50 must be made such that the signals entering the E/O converter 50 are connected to corresponding electrodes 66. In other words, the electrical signals from a signal conditioner 98 are typically connected to electrodes 66 such that the electrical signals are modulated onto optical signals traveling in the same direction through the modulator 64. The particular manner in which the connections are made can vary, however, depending on the particular application and the desired results.

Figure 9:
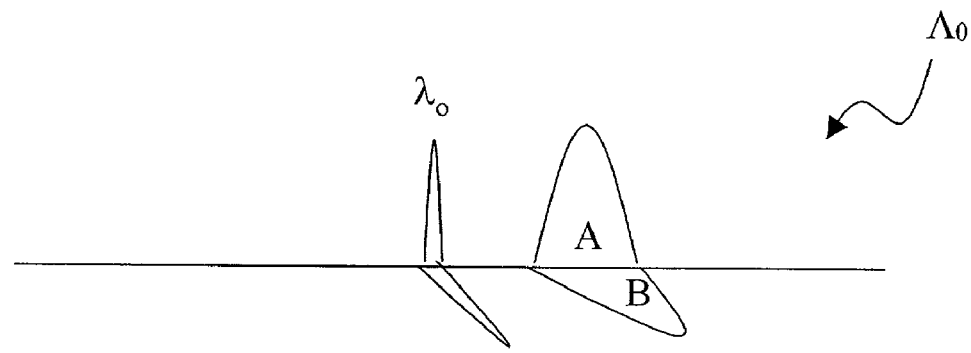
FIGS. 9–11 illustrate other examples of signal profiles that can be generated with the transmitters.

FIG. 9 illustrates an example of an optical signal $\Lambda_0$ including a single-sideband orthogonal signal pair that can be produced by the transmitter of FIG. 8. In that embodiment, the optical carrier is not suppressed, although in other embodiments the optical carrier can be suppressed.

Figure 10:
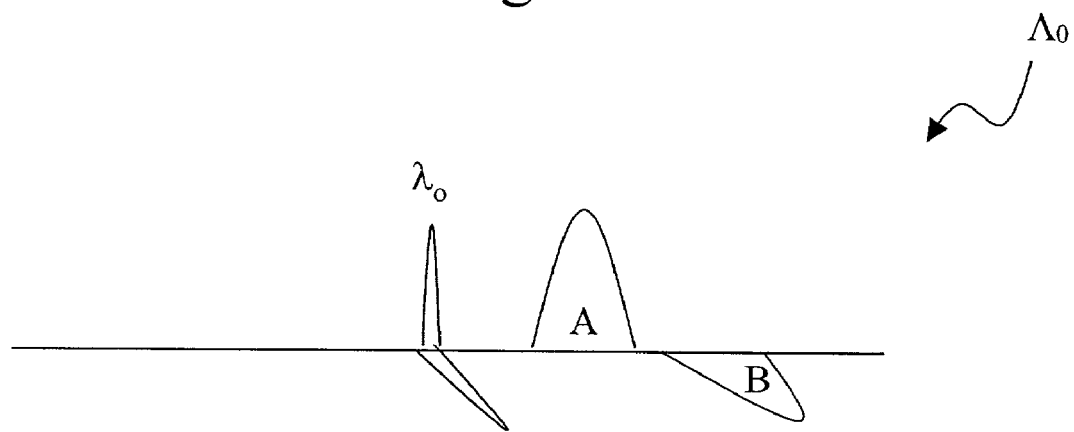
Figure 11:
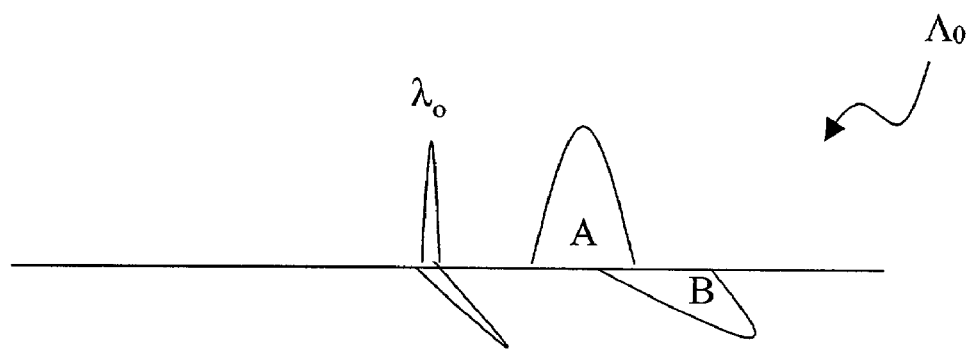

FIGS. 10 and 11 illustrate other examples of optical signals in which the orthogonal pairs are offset from each other. That signal can be produced with a transmitter 20 such as that illustrated in FIG. 8, except with separate electrical carrier sources 80, each producing a different electrical carrier frequency. The optical signals may partially overlap or they may not overlap at all.

Figure 12:
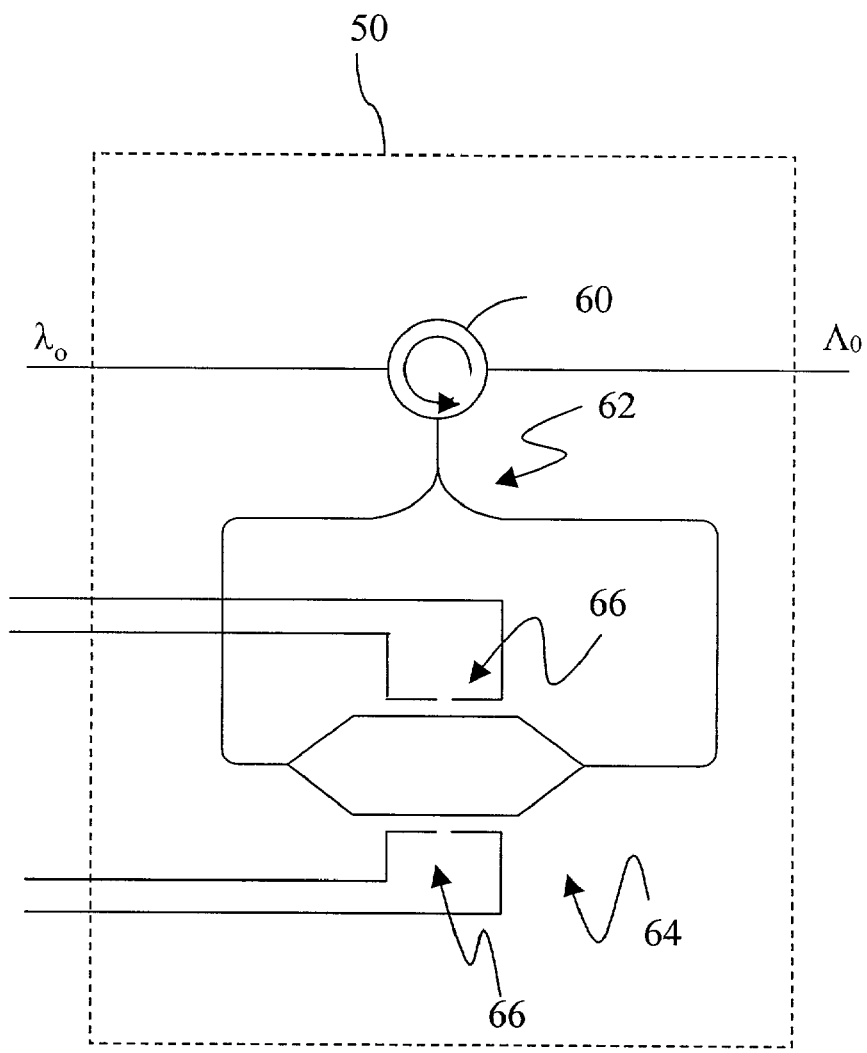
FIG. 12 illustrates another embodiment of an electrical to optical converter.

FIG. 12 illustrates another embodiment of the E/O converter 50 including a single Mach-Zehnder modulator 64 having a set of electrodes 66 corresponding to each leg of the modulator 64. In that embodiment, each set of electrodes 66 can carry data signals in opposite directions, corresponding to directions of the split optical carrier components passing through the modulator 64. Alternatively, a set of electrodes 66 can be replaced with a single electrode, such that the single electrode can carry electrical signals traveling in one or both directions, as described in more detail hereinbelow.

Figure 13:
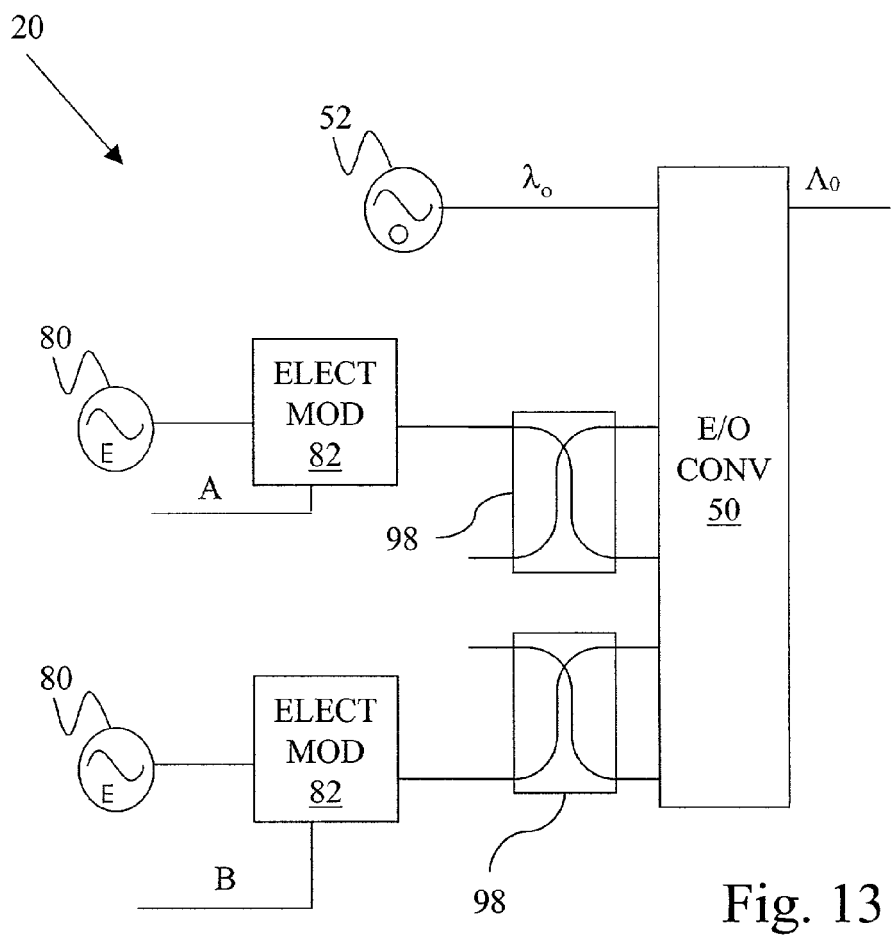
FIG. 13 illustrates another embodiment of a transmitter.
Figure 14:
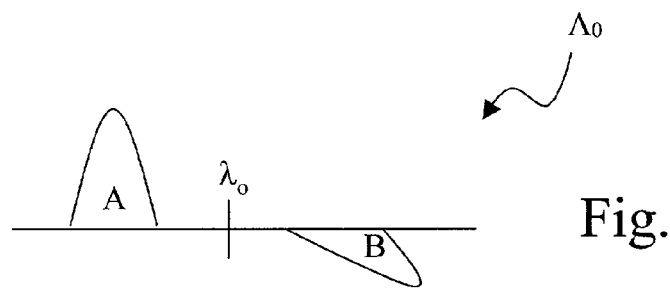
FIG. 14 illustrates another example of a signal profile that can be generated with the transmitters.

FIGS. 13 and 14 illustrate another embodiment of the transmitter 20 and an example of the optical signal $\Lambda_0$ that it can produce. In that embodiment two data signals are produced as a single sideband orthogonal pair, with the signals in the orthogonal pair on opposite sides of the optical carrier $\lambda_o$.

Figure 15:
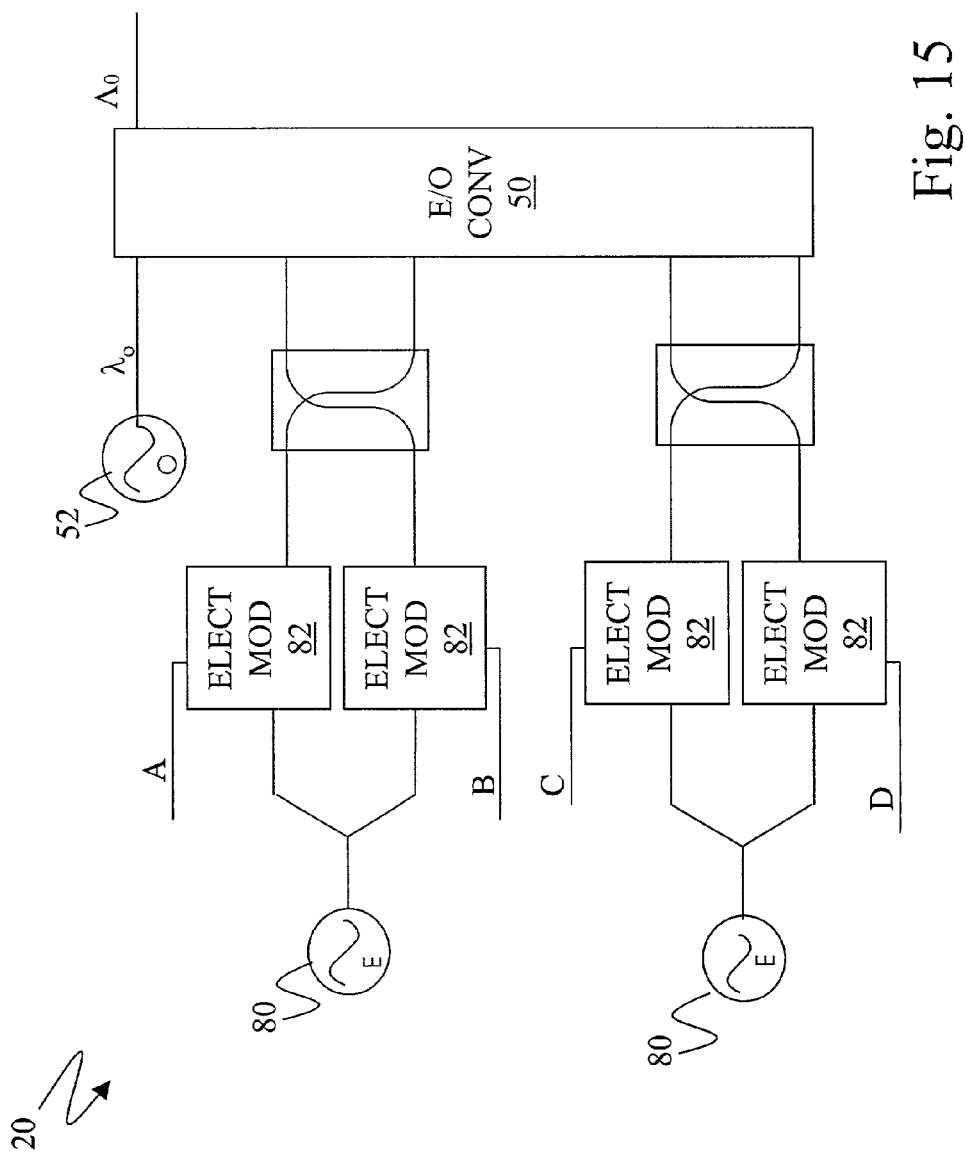
FIG. 15 illustrates another embodiment of a transmitter.

FIG. 15 illustrates another embodiment of the transmitter 20 in which four baseband signals are modulated onto electrical carriers and provided to the E/O converter 50. That embodiment includes two electrical carrier sources 80 and four electrical modulators 82, although more or less electrical carrier sources 80 and electrical modulators 82 can be used. The transmitter 20 can include, for example, an E/O converter 50 with a double parallel Mach-Zehnder modulator 64, such as illustrated in FIG. 8, or on a single Mach-Zehnder modulator 64, such as illustrated in FIG. 12.

Figure 16:
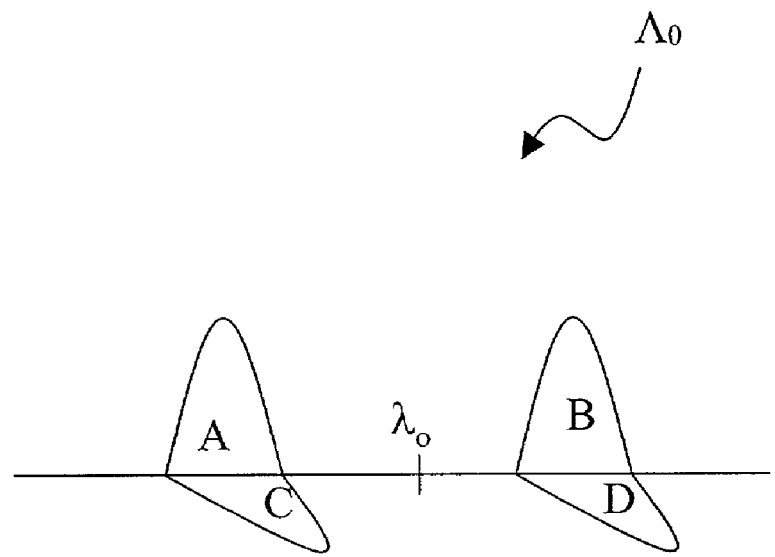
FIGS. 16 and 17 illustrate examples of signal profiles that can be generated by the transmitters.

FIG. 16 illustrates an example of orthogonal optical signals that can be produced by the transmitter 20 of FIG. 15. In that example, the electrical carrier sources 80 produce the same electrical carrier frequency, and the E/O converter 50 is configured to produce single sideband, orthogonally polarized optical signals with a suppressed optical carrier $\lambda_0$. One pair of orthogonal signals (e.g., the pair corresponding to "A" and "C") is at an optical sideband frequency lower than the frequency of the optical carrier $\lambda_0$, and the other pair of orthogonal signals (e.g., the pair corresponding to "B" and "D") is at an optical sideband frequency higher than the frequency of the optical carrier $\lambda_0$, and together the four optical signals carry the data from the four baseband signals A, B, C, and D, respectively, of FIG. 15.

Figure 17:
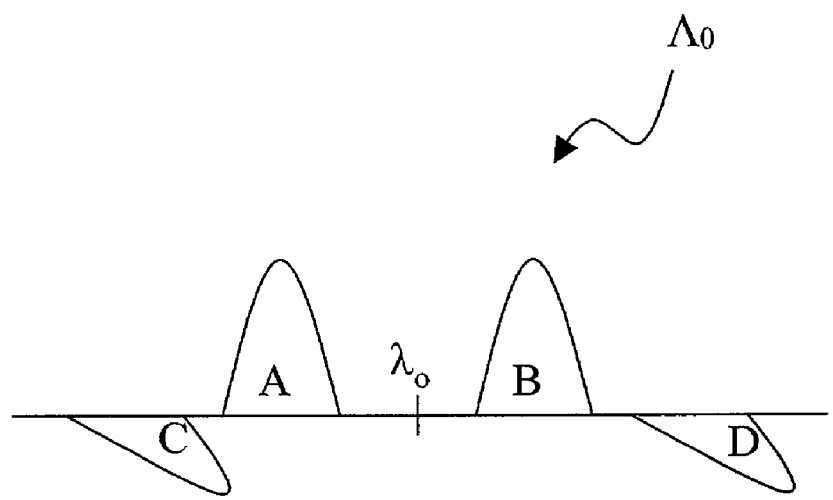

FIG. 17 illustrates another example of the signals that can be produced by the transmitter 20 of FIG. 15, in which different electrical carrier frequencies are used, and the E/O converter 50 is configured to produce single sideband, orthogonal optical signals. The pairs of orthogonal optical signals are offset from each other by a frequency determined by the difference in the respective electrical carrier frequencies.

Figure 18:
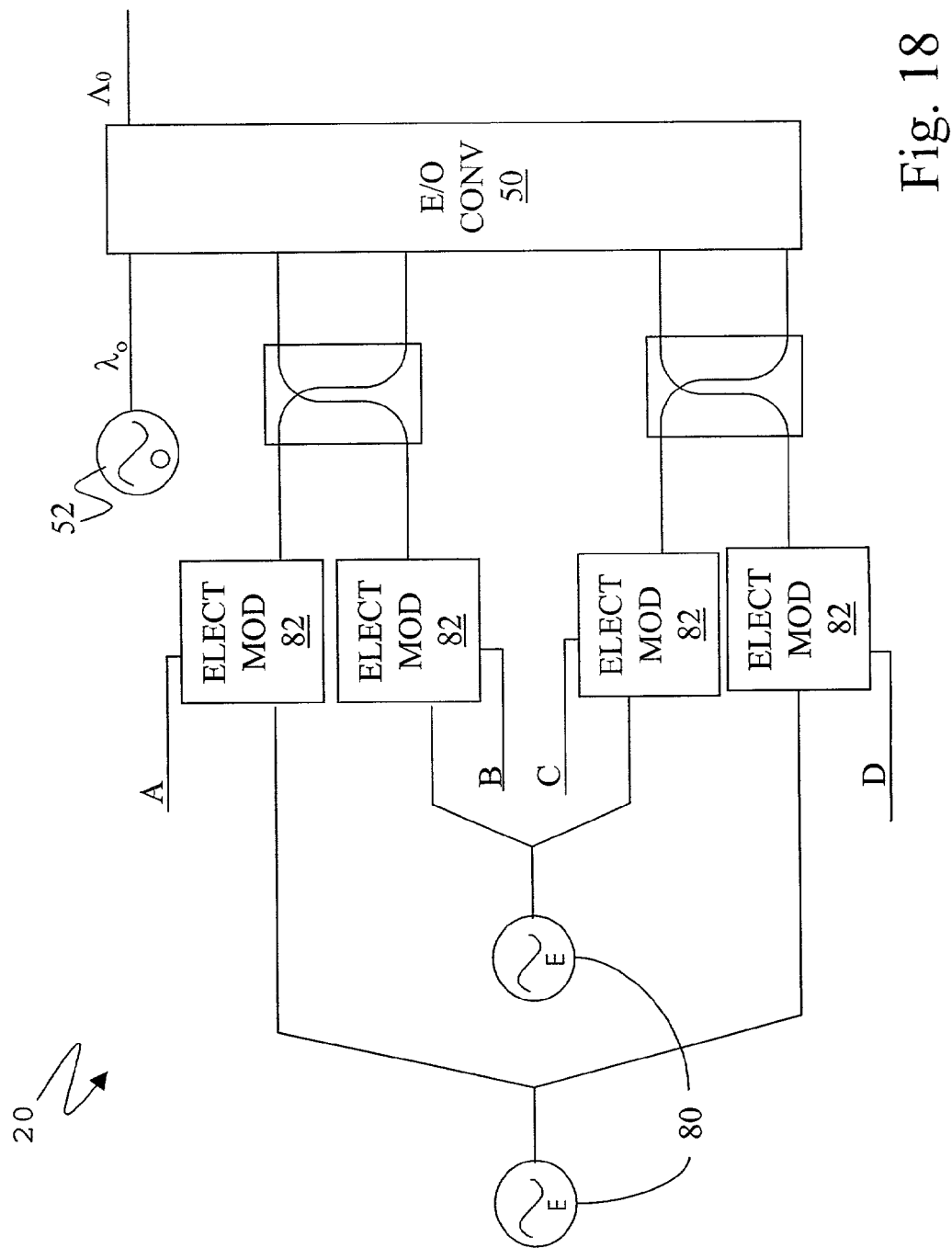
FIG. 18 illustrates another embodiment of a transmitter.
Figure 19:
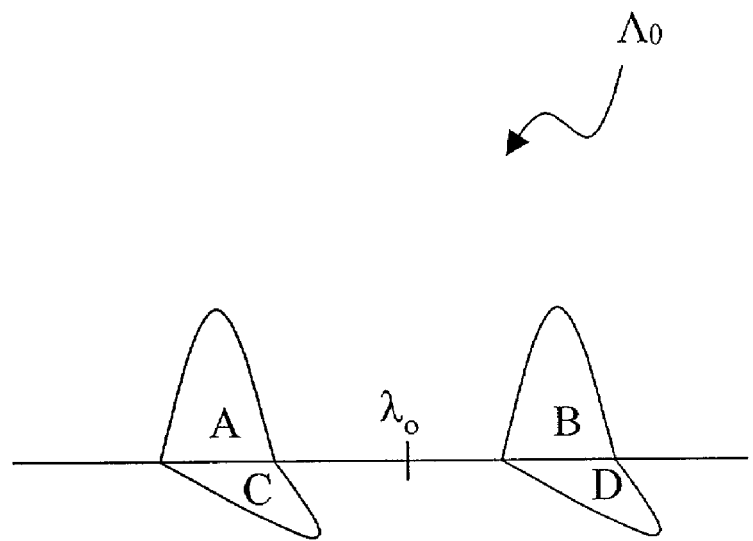
FIGS. 19 and 20 illustrate another example of a signal profile that can be generated by the transmitters.
Figure 20:
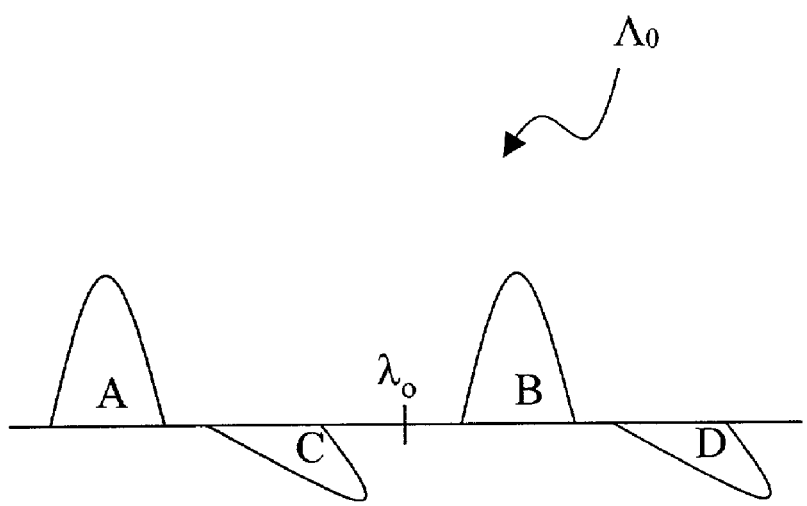

FIGS. 18–20 illustrate another embodiment of the transmitter 20 and examples of the signals it can produce. The orthogonal pairs may or may not be offset from each other, depending on the relative frequency of the electrical carrier sources 80.

Figure 21:
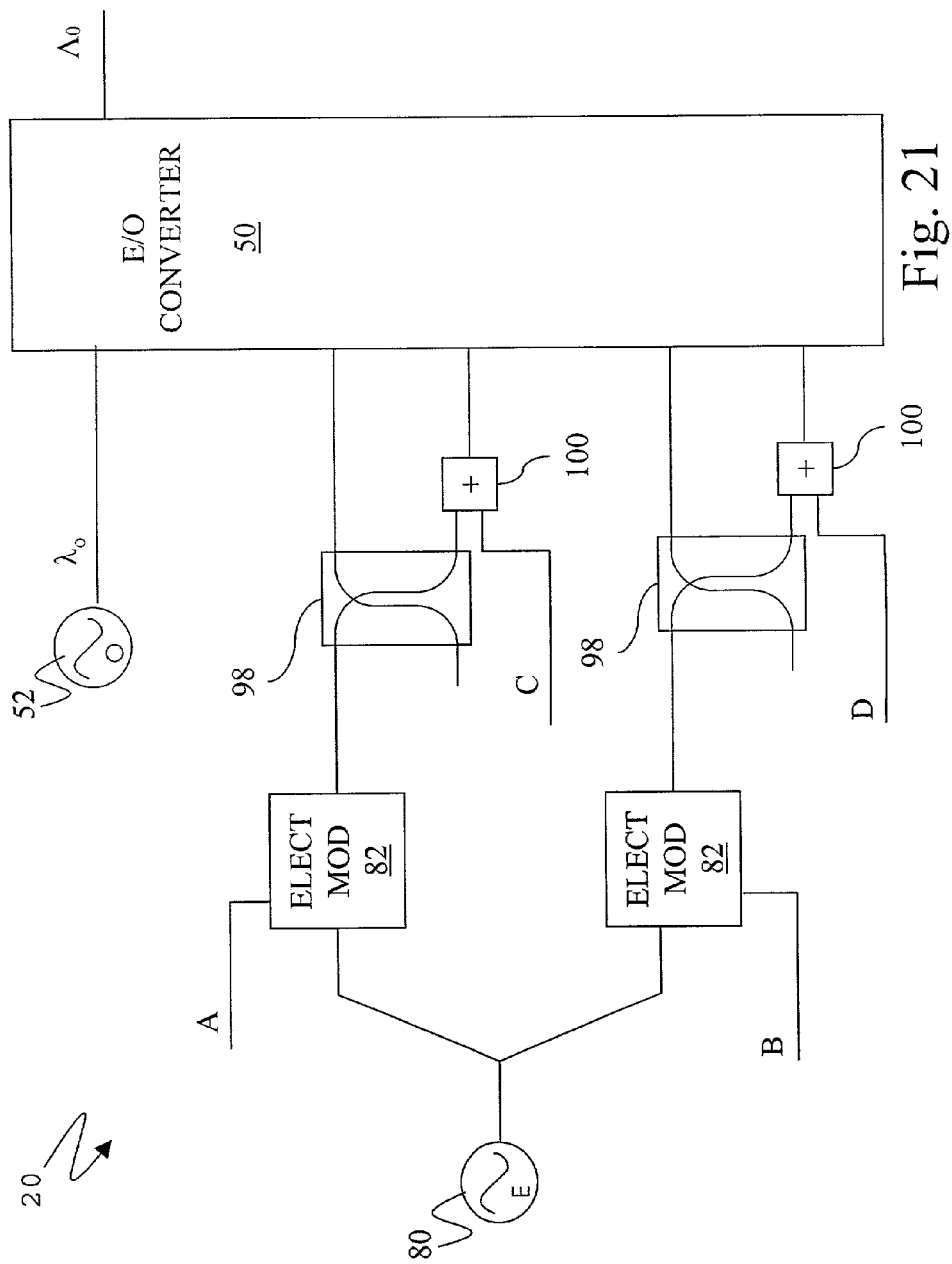
FIG. 21 illustrates another embodiment of a transmitter.

FIG. 21 illustrates another embodiment of the transmitter 20 including electrical adders 100, and in which two baseband signals are modulated onto the optical carrier $\lambda_o$, and two signals are modulated onto sidebands of the optical carrier $\lambda_o$. The transmitter 20 includes electrical adders 100 to combine output from signal conditioners 98 with data signals to be modulated onto the optical carrier $\lambda_o$.

Figure 22:
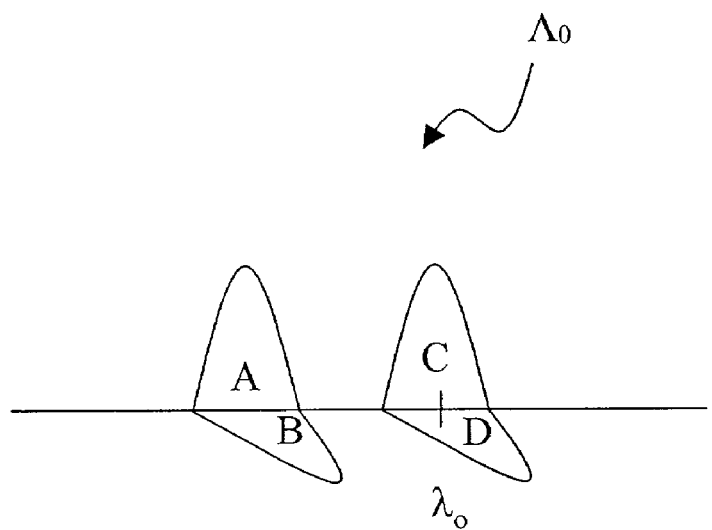
FIG. 22 illustrates another example of signal profiles that can be generated by the transmitters.

FIG. 22 illustrates an example of an orthogonal pair of optical signals (C and D) modulated onto the optical carrier and an orthogonal pair of optical signals (A and B) modulated onto a sideband frequency, such as can be produced by the transmitter 20 of FIG. 21.

Figure 23:
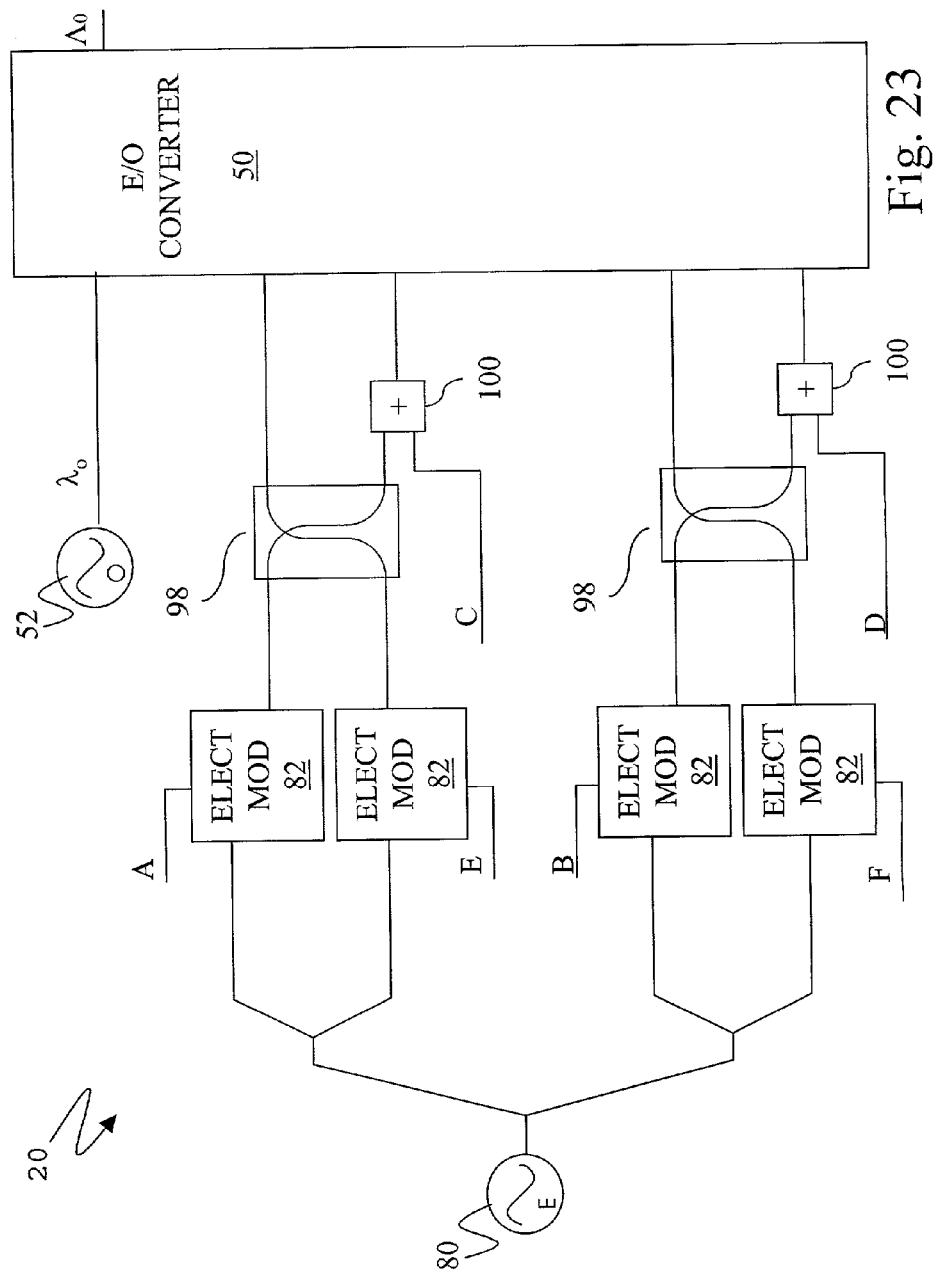
FIG. 23 illustrates another embodiment of a transmitter.

FIG. 23 illustrates another embodiment of the transmitter 20 that can be used to modulate four signals (A, B, E, and F) onto four separate subcarriers and to modulate two signals (C and D) onto the optical carrier frequency $\lambda_o$.

Figure 24:
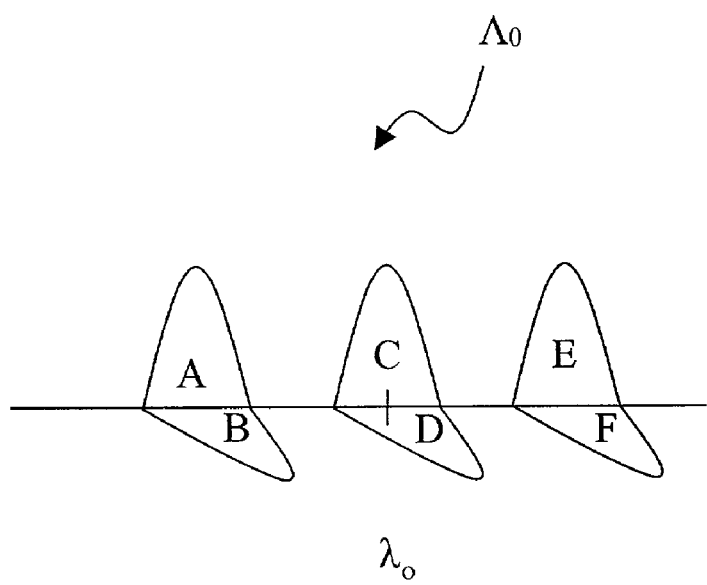
FIG. 24 illustrates another example of signal profiles that can be generated by the transmitters.

FIG. 24 illustrates an example of optical signals that can be produced with a transmitter such as the one shown in FIG. 23. In that example, four signals (A, B, E, and F) are modulated onto two orthogonal pairs of subcarriers and two signals (C and D) are modulated onto orthogonally-polarized signals at the optical carrier frequency $\lambda_o$.

Figure 25:
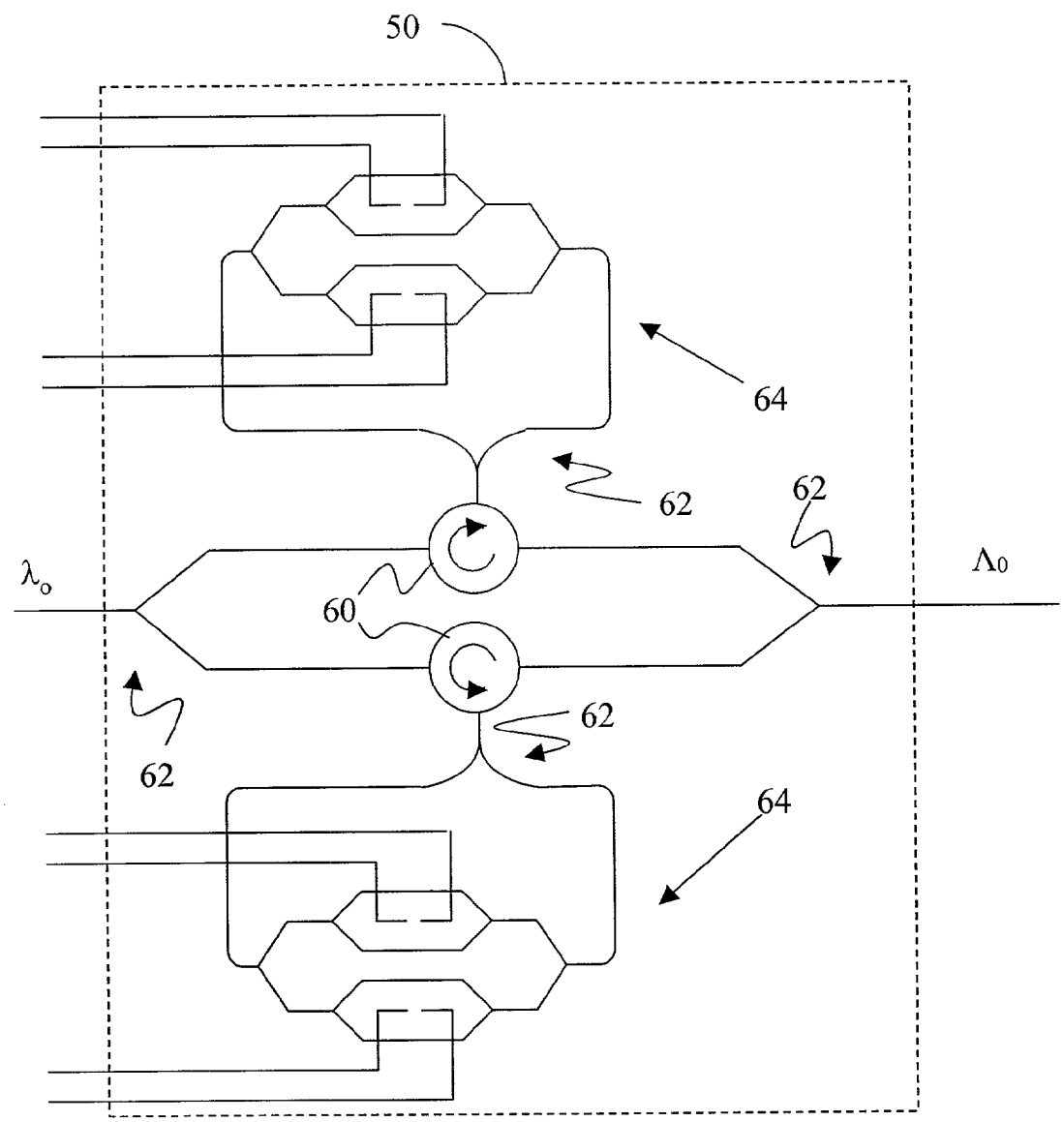
FIGS. 25–27 illustrate other embodiments of electrical to optical converters.

FIG. 25 illustrates another embodiment of the E/O converter 50 in which two modulators 64 are used and a common optical carrier $\lambda_0$ is provided to both modulators 64. More than two modulators 64 can also be used in the E/O converter 50, and different types of modulators 64 can be used within the E/O converter 50. For example, a double parallel Mach-Zehnder modulator 64 and a single Mach-Zehnder modulator 64 can be used in the same E/O converter 50.

Figure 26:
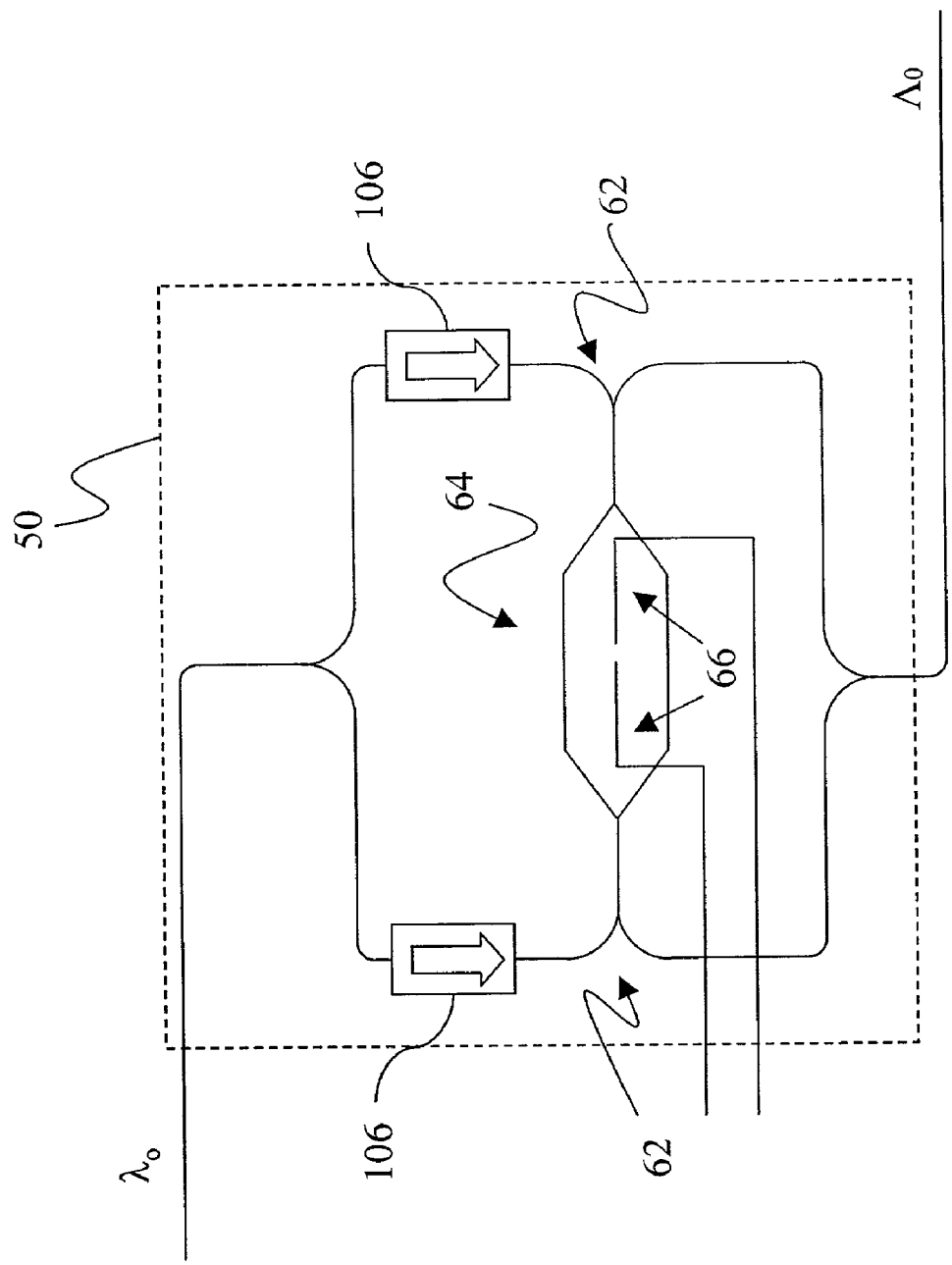

FIG. 26 illustrates another embodiment of the E/O converter 50. In that embodiment, splitters and combiners are used to separate and combine the optical signals and to direct signals into the modulator 64 and direct modulated signals out of the converter 50. That embodiment uses a splitter to split the incoming optical carrier $\lambda_o$, and a separate combiner to combine the modulated optical carrier $\lambda_o$ components. Isolators 106 can be used to prevent signals exiting the modulator 64 from propagating backwards through the converter 50. The illustrated embodiment shows two isolators 106, although the present invention may include only one isolator 106, which may be located before the splitter. The illustrated E/O converter 50 can be used combination with other embodiments of the E/O converter 50 and other modulators 64, as discussed above.

Figure 27:
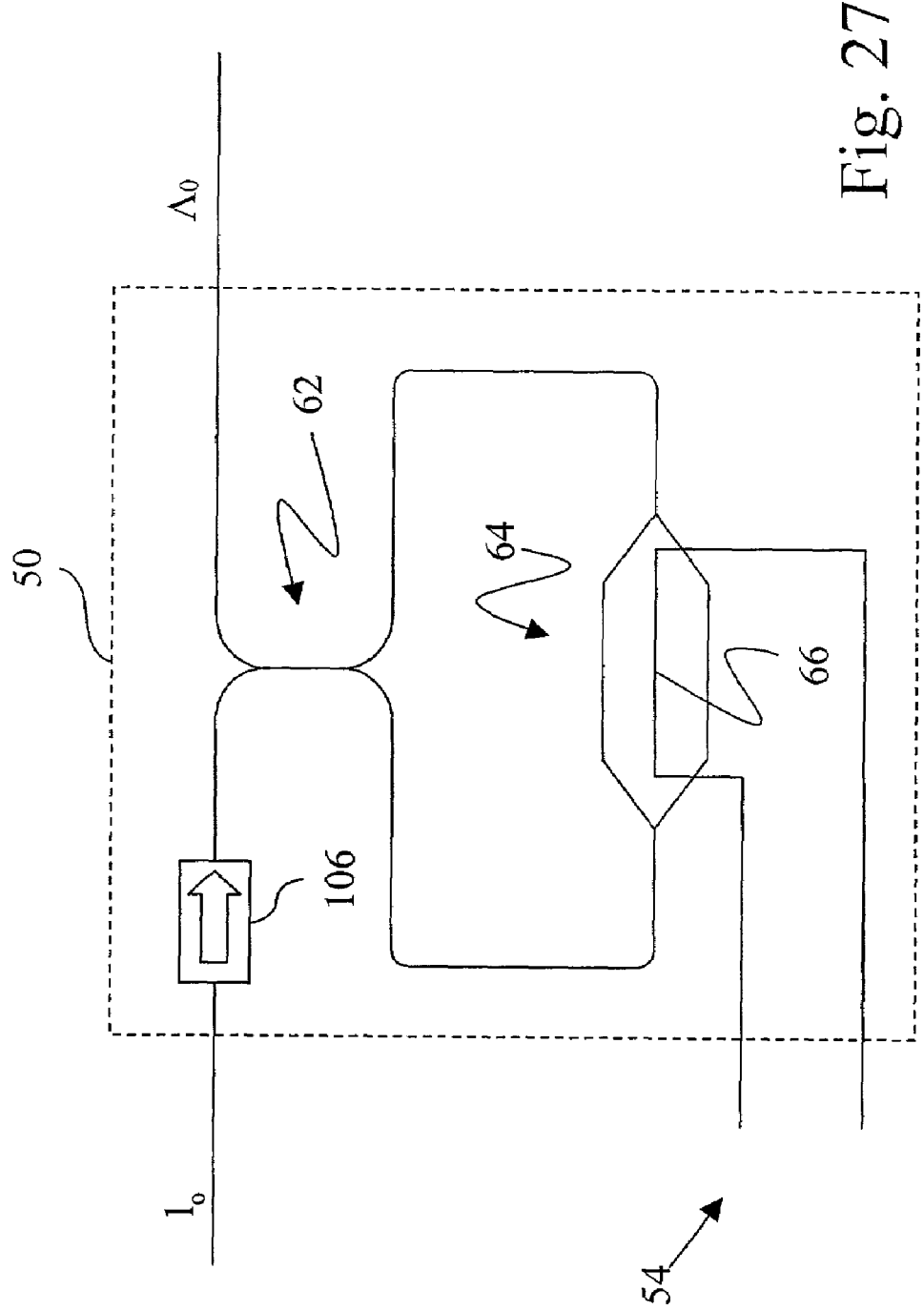

FIG. 27 illustrates an embodiment of an E/O converter using a splitter/coupler 62 and isolator 106. In that embodiment, the splitter/coupler 62 and isolator 106 allow the unmodulated optical carrier $\lambda_o$ into the E/O converter 50, allow the modulated optical signal $\Lambda_o$ out of the E/O converter 50, and prevent the modulated optical signal $\Lambda_o$ from traveling backwards through the input of the E/O converter 50. The E/O converter 50 utilizes a modulator 64 in which a single electrode 66 is used in place of a pair of electrodes 66. That electrode configuration, as well as the other aspects of this embodiment, can be applied to other embodiments of the invention. Furthermore, other variations can be used with this embodiment, such as those with different modulators and electrode configurations.

The E/O converters 50 shown in FIGS. 26 and 27 are generally less expensive than comparable embodiments using circulators 60, but they also result in more signal loss than comparable embodiments using circulators 60. In other embodiments, circulators or analogous devices may be used in place of some or all of the splitters and combiners in the E/O converters 50.

Figure 28:
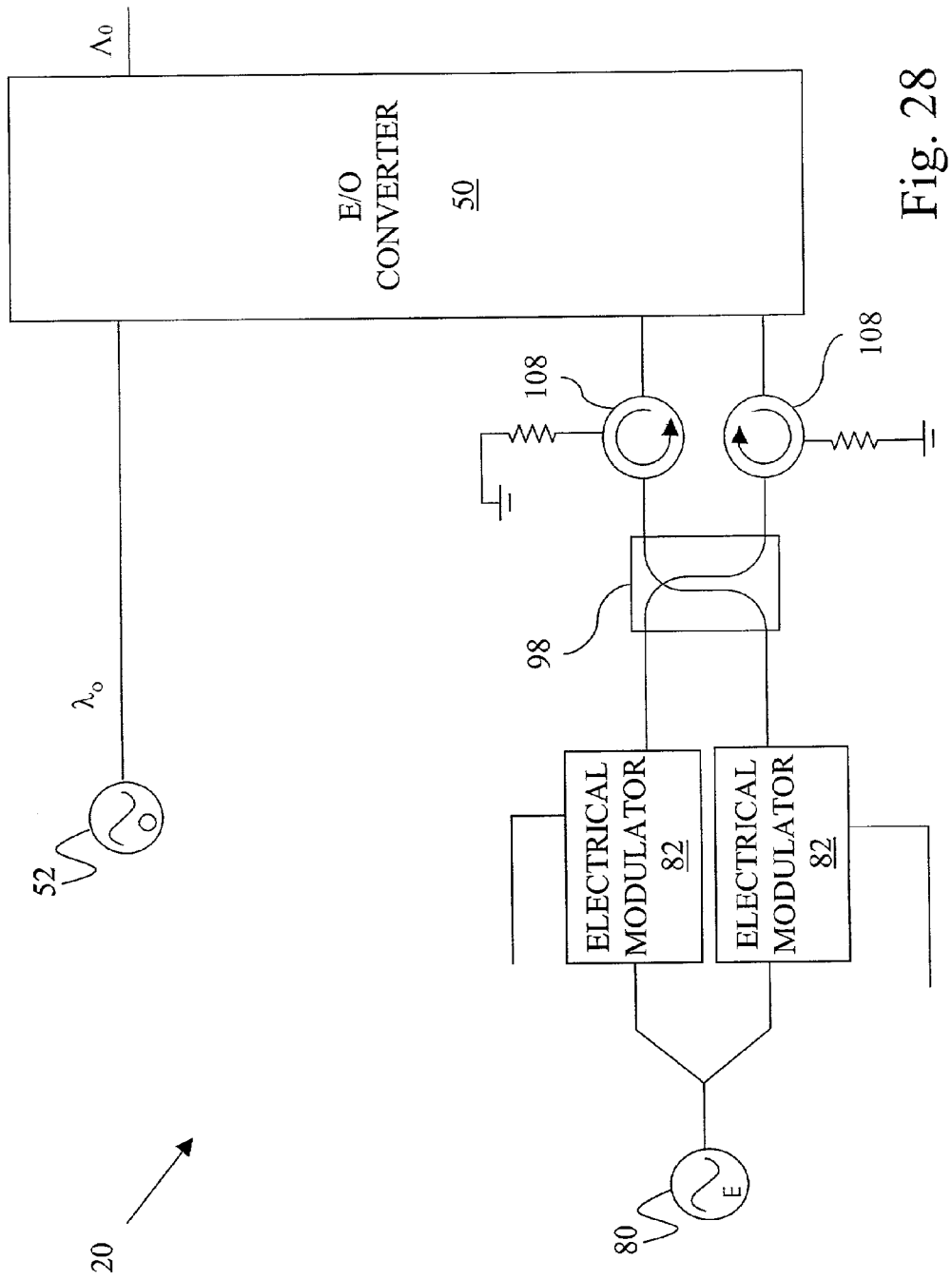
FIGS. 28 and 29 illustrate other embodiments of transmitters.

FIG. 28 illustrates another embodiment of the transmitter 20 in which electrical data signals are terminated after they pass through the electrical to optical converter 50, such as may be used with E/O converters 50 similar to that shown in FIG. 27. In that embodiment, electrical circulators 108 allow the electrical data signals coming from the signal conditioner 98 to pass into the E/O converter 20, and electrical data signals returning from the E/O converter 50 are diverted to an electrical termination circuit. In the illustrated embodiment, the signals being terminated are electrically modulated signals that have passed through the signal conditioner 98, although such termination is also applicable to other embodiments of the invention, such as base band signals, signals which have not passed through a signal conditioner 98, etc.

Figure 29:
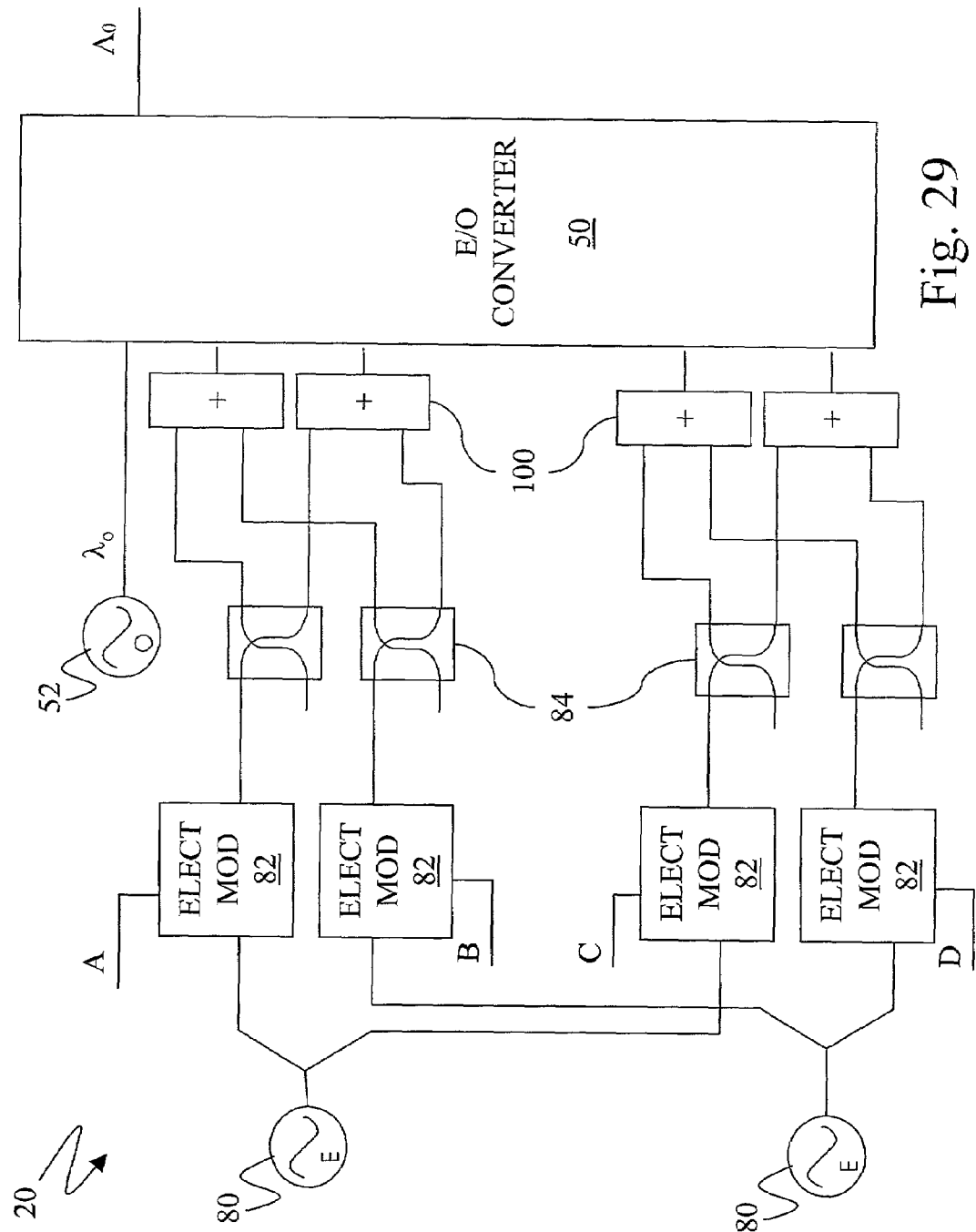

FIG. 29 illustrates another embodiment of the transmitter 20 in which four different signals are modulated onto four corresponding subcarriers, all of which are on the same side of the optical carrier. In that embodiment, each signal is modulated onto an electrical carrier, and each electrical modulated signal passes through a signal conditioner 98 to provide the requisite signal conditioning to facilitate single sideband operation. Electrical adders 100 are used to combine signals prior to providing the combined signals to the electrodes 66 of the E/O converter 50. In the illustrated embodiment, signals A and B will have the same optical polarizations, so they are modulated onto electrical carriers having different frequencies so that the signals will be placed on different subcarrier frequencies, and thereby not interfere with each other. The same is true with signals C and D, except that those signals will have an optical polarization orthogonal to that of signals A and B. In the illustrated embodiment, two different electrical carrier sources 80, each producing an electrical carrier having a different frequency, are used. One electrical carrier source 80 is used with one orthogonal pair of signals, and the other electrical carrier source 80, having a different frequency, is used with the other orthogonal pair of signals. In other embodiments, more than two electrical carrier sources 80 can be used.

Each signal conditioner 84 is shown as utilizing only one of two inputs. In other embodiments, both inputs can be utilized, such as by connecting each input to the output of other electrical modulators 82 used with other data signals, to produce subcarriers carrying the additional data signals and located at other subcarrier frequencies. Other variations of the illustrated embodiment are also possible, such as utilizing the transmitter with more or less signals, using more or less adders with different number of inputs, using signal conditioners with different numbers of inputs and outputs, etc.

Figure 30:
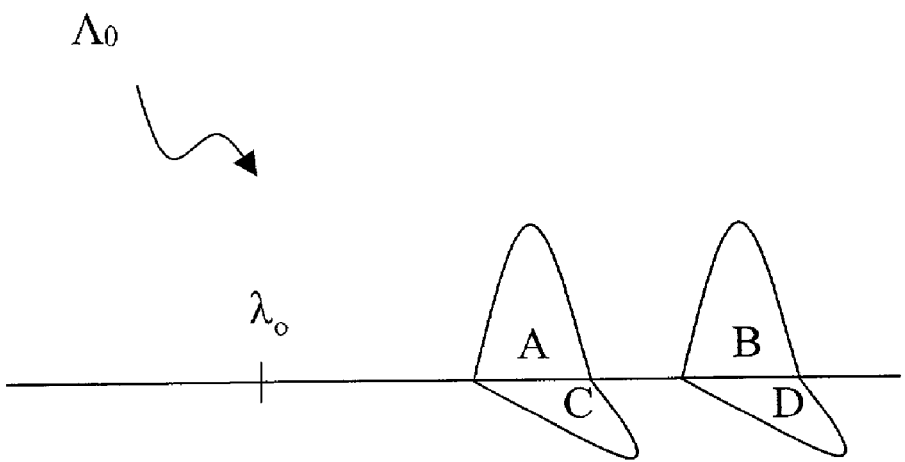
FIGS. 30 and 31 illustrate examples of signal profiles that can be generated by the transmitters.

FIG. 30 illustrates an example of optical signals $\Lambda_O$ that can be produced by the transmitter 20 illustrated in FIG. 29. Because each electrical carrier source 80 is used with two of the signals, the signals sharing the same electrical carrier source 80 are at the same subcarrier frequency, although with orthogonal polarizations.

Figure 31:
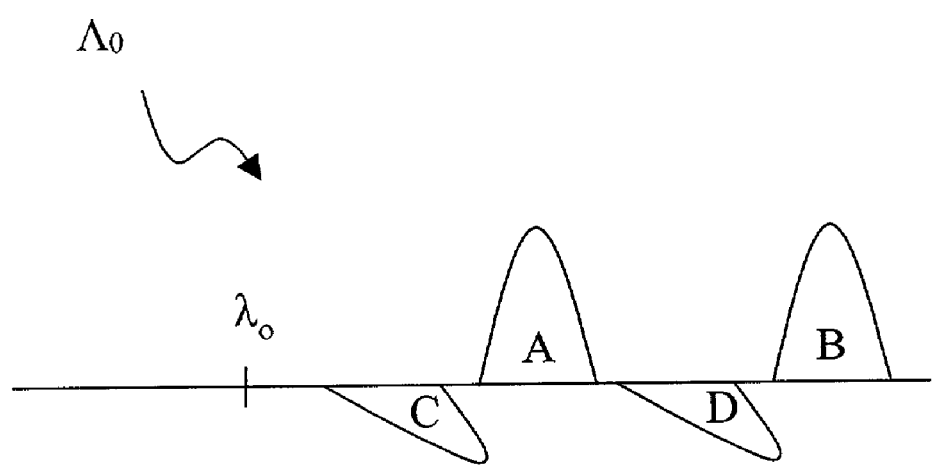

FIG. 31 illustrates another example of optical signals $\Lambda_O$ that can be produced by a transmitter 20 such as that illustrated in FIG. 29. In that embodiment, each signal is at a different subcarrier frequency, such as can be accomplished by using a different electrical carrier source 80 for each electrical modulator 82, each producing an electrical carrier having a different frequency.

Figure 32:
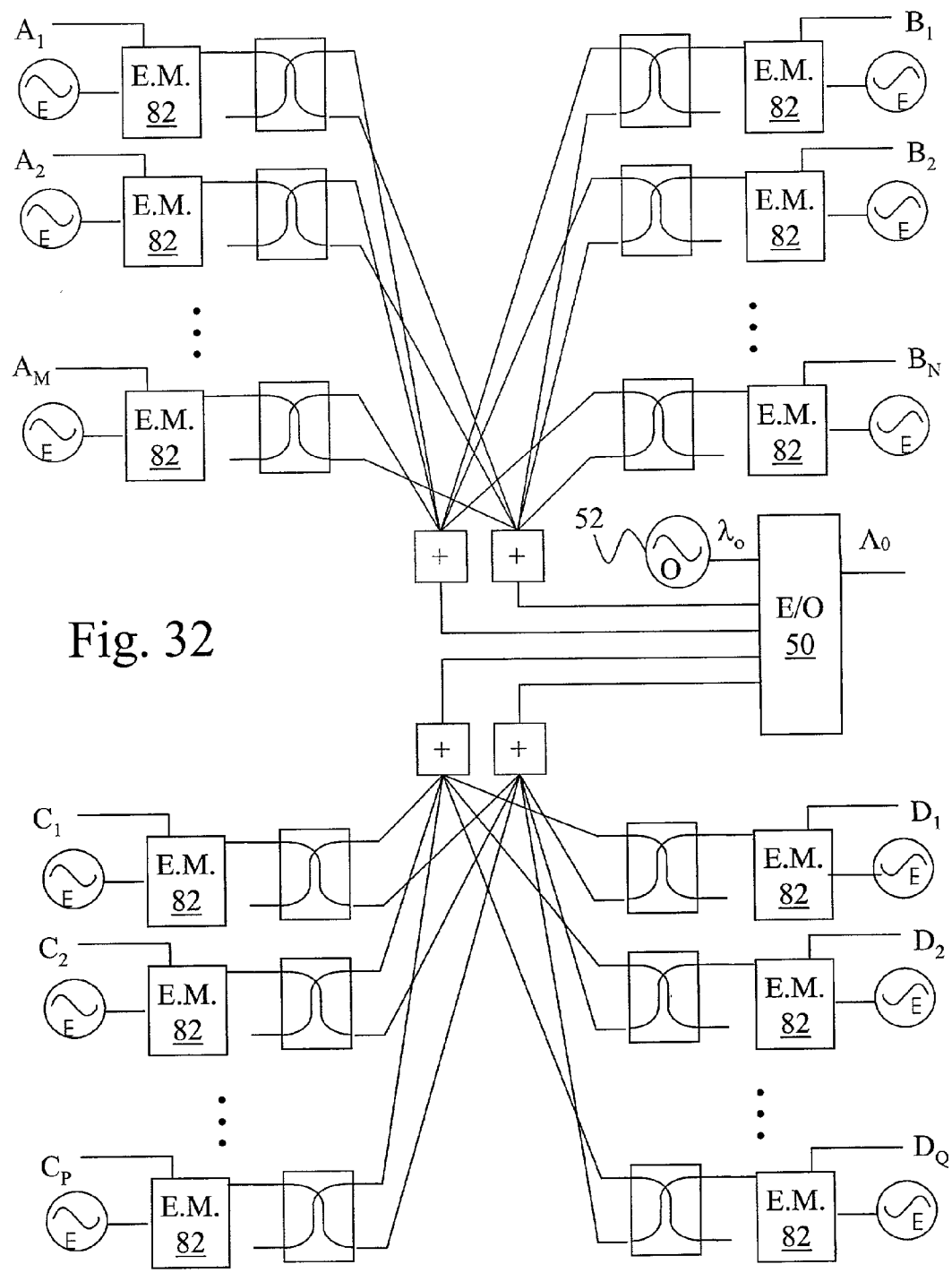
FIG. 32 illustrates another embodiment of a transmitter.
Figure 33:
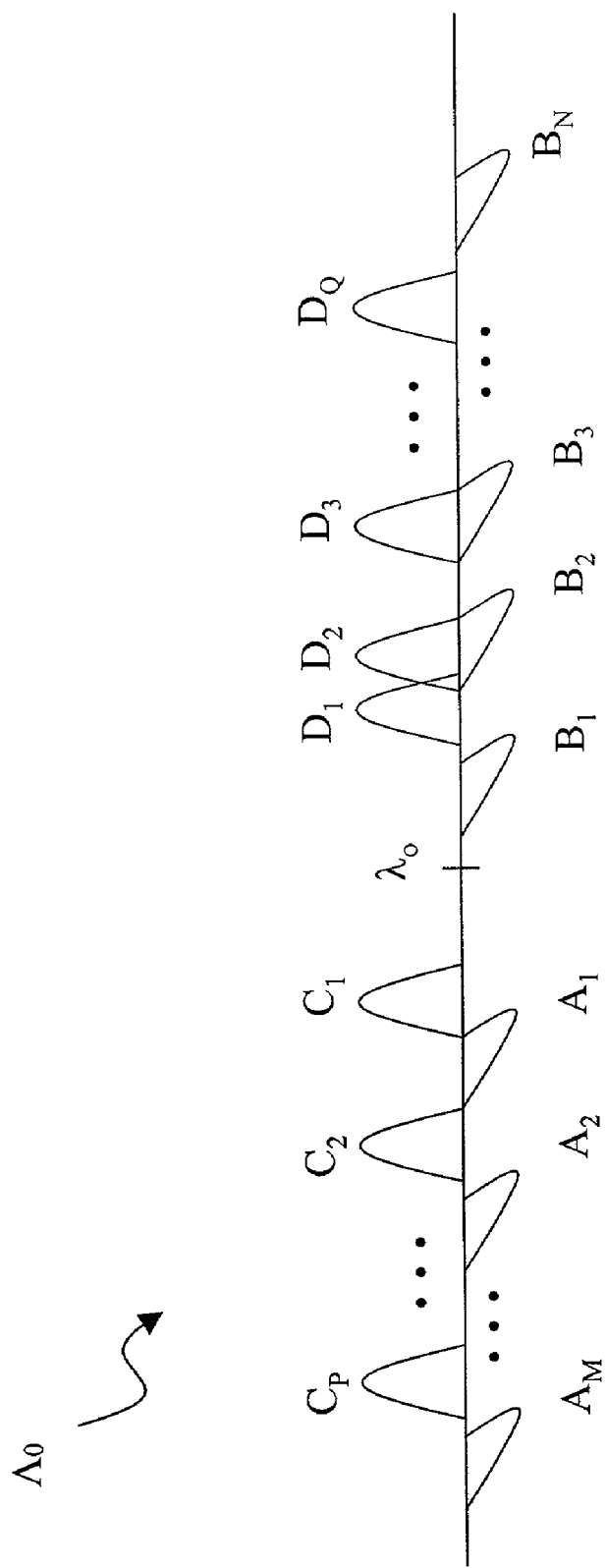
FIG. 33 illustrates another example of a signal profile that can be generated by the transmitters.

FIGS. 32 and 33 illustrate another embodiment of the transmitter 20 and an example of the signals that it can generate. Many variations are possible with that transmitter 20. For example, the number of signals being generated at the transmitter 20 may vary, the signals may be uniform in their spacing and orientation, or the signals may vary, such as with some signals overlapping in the frequency domain, some signal pairs at the same frequency, some signal pairs offset from each other, by using different polarization orientations, etc. Other variations are also possible, such as those described hereinabove.

Figure 34:
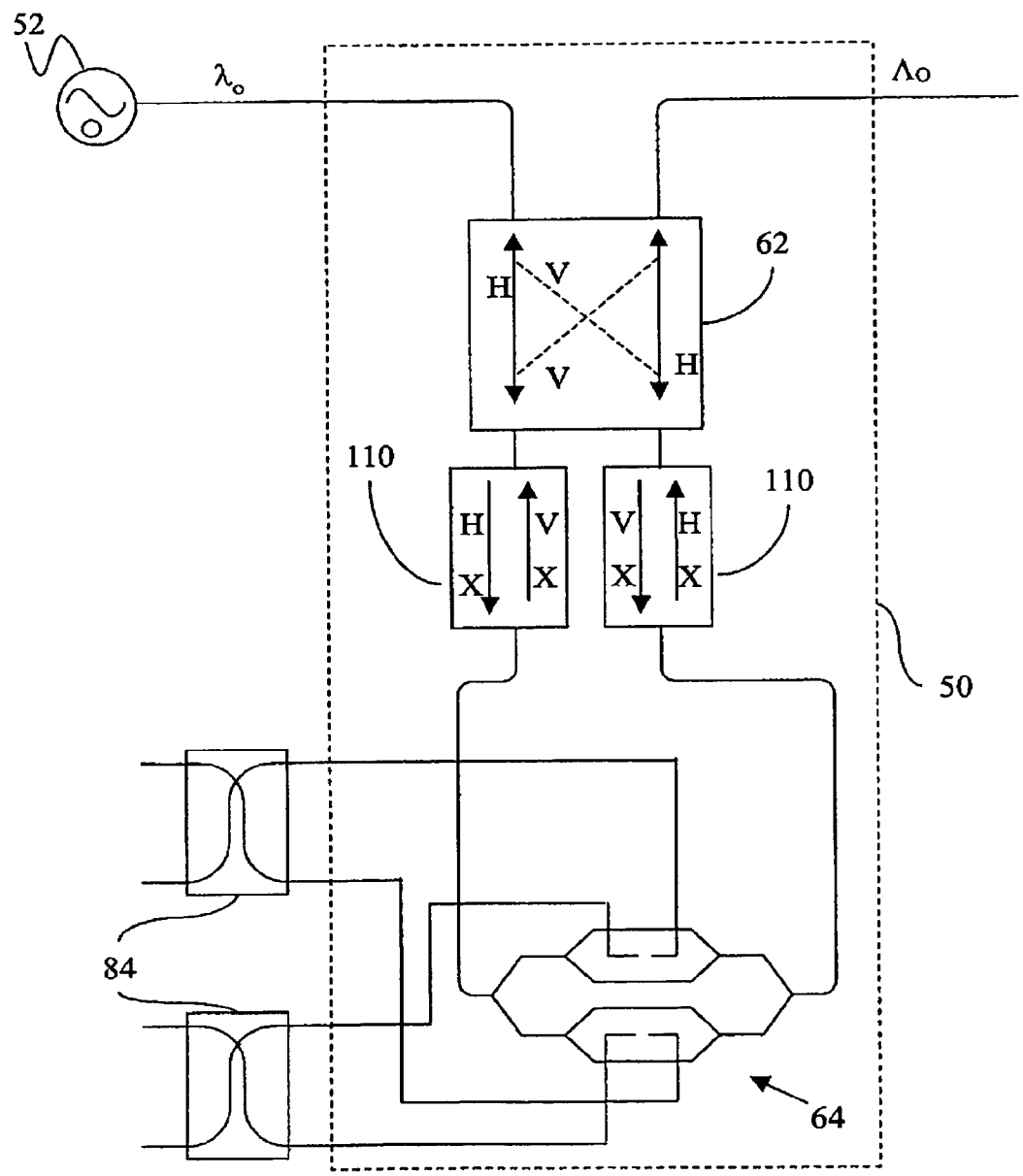
FIG. 34 illustrates another embodiment of an electrical to optical converter.

FIG. 34 illustrates another embodiment of an E/O converter 50 including polarization converters 110, such as uni-directional TE/TM converters or 45 degree Faraday rotators, and a polarization splitter/coupler 62. That embodiment illustrates a particular form of a four port polarization splitter/coupler 62, although other forms of splitters/couplers may be used, and that particular splitter/coupler 62 may be used in other embodiments of the invention.

The polarization converters 110 may be used to convert the polarization orientation of the polarization components of the optical carrier $\lambda_o$, such as when the modulator 64 is polarization sensitive. For example, the polarization converters 110 may be used to temporarily orient the orthogonal polarization components of the optical carrier $\lambda_o$ into the same intermediate polarization orientation (illustrated as "X" in the polarization converters 110 illustrated in FIG. 34) before the polarization components pass through the modulator 64, and then to restore the orthogonal polarization orientation after the components pass through the modulator 64. In one example, the first time the polarization components pass through the polarization converters 110, the polarization converters 110 shift the polarization components by forty-five (45) degrees towards each other so that both orthogonal polarization components are converted to the same polarization orientation midway between their original polarization orientations. When the converted polarization components pass through the polarization converters 110 the second time, the polarization components are converted back into an orthogonal polarization orientation.

In other embodiments, such as when the modulator 64 is not polarization sensitive, the polarization converters 110 may be omitted. In yet other embodiments, the polarization converters 110 may be used but the intermediate polarization orientation may be different for each polarization component, or the polarization components may be polarization converted more or less times than illustrated herein.

Figure 35:
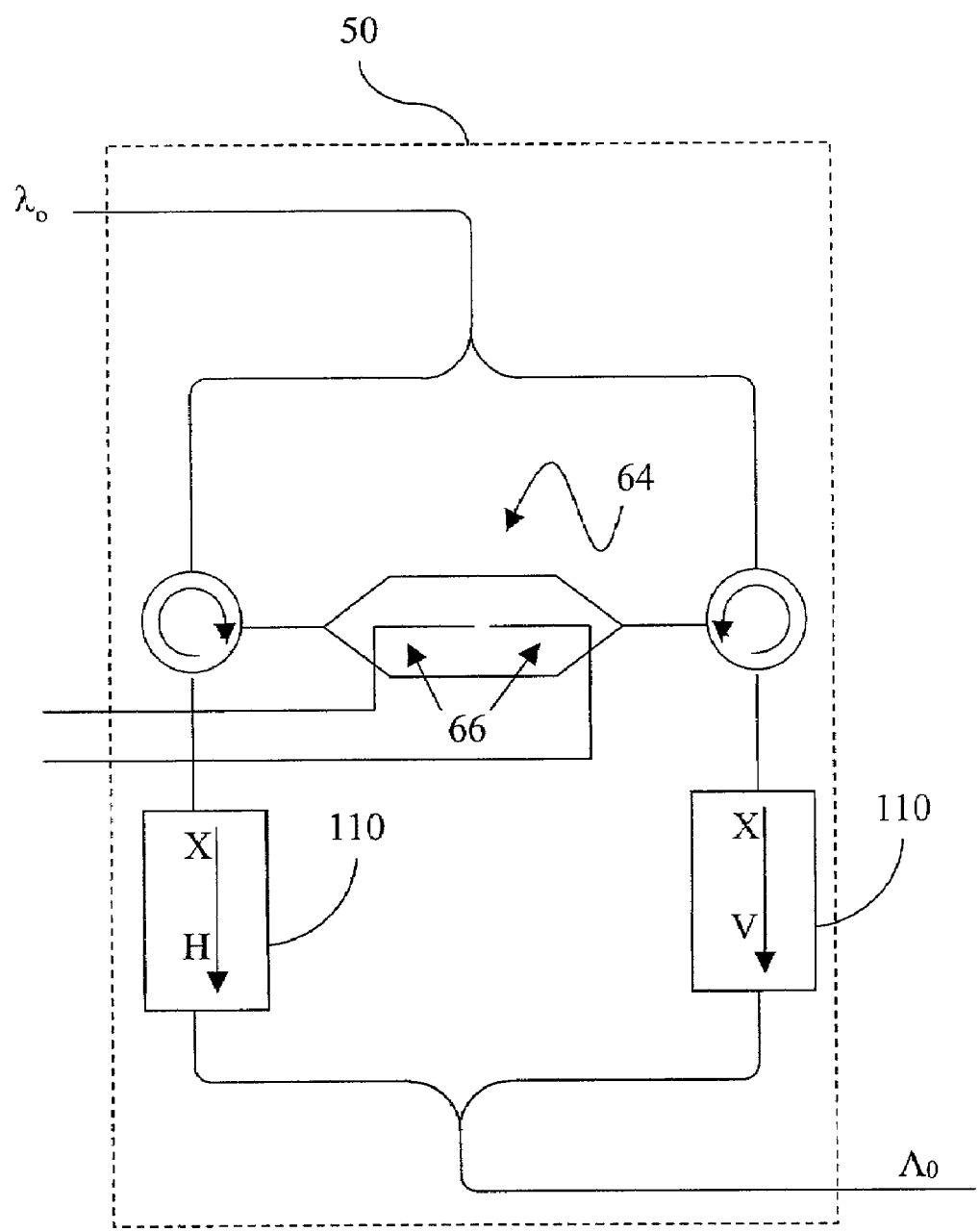
FIG. 35 illustrates another embodiment of an electrical to optical converter.

FIG. 35 illustrates another embodiment of an electrical to optical converter 50. That embodiment is similar to the E/O converter 50 illustrated in FIG. 26, and it includes an optical splitter and a separate optical combiner. However, this embodiment utilizes polarization converters before the combiner, so that the modulated optical signals are polarization converted before being combined. In one embodiment, the optical carrier $\lambda_O$ is not split into orthogonal polarization components at the splitter but instead is split into components of the same polarization. After the optical components pass through the modulator 64, they pass through the polarization converters 110 which changes their polarization so that they have orthogonal polarization orientations, or some other desired polarization orientation. Thereafter, the polarization components are combined by the combiner.

Many variations and modifications can be made to the present invention without departing from its scope. For example, advantages of the present invention can be realized with different numbers, configurations, and combinations of modulators 64, electrodes 66, E/O converters 50, and other components. Similarly, different numbers and forms of electrical data signals and electrical and optical sources 80, 52 can also be utilized with the present invention. For example, some components can be eliminated, such as when their function is not required or desired, or when the function is performed in another part of the device or system. For example, isolators may not be necessary because many optical sources include integral isolators. Many other variations, modifications, and combinations are taught and suggested by the present invention, and it is intended that the foregoing specification and the following claims cover such variations, modifications, and combinations.

The invention claimed is:

1. An optical transmitter, comprising:
  an optical source;
  a four port polarization splitter/coupler having a first port connected to the optical source, having a second port for outputting optical data signals, and having third and fourth ports;
  first and second polarization converters, each having a first port connected to the third and fourth ports of the splitter/combiner, respectively, and each having a second port, wherein the first and second polarization converters convert first and second optical data signals having same polarization orientations, and received at the second ports of the first and second polarization converters, into first and second optical data signals having different polarization orientations at the first ports of the polarization converters;
  a modulator having first and second optical ports respectively connected to the second ports of the polarization converters, and having a plurality of electrical input terminals;
  wherein the splitter/combiner splits an optical carrier received from the optical source at the first port of the splitter/combiner into first and second optical carrier components having different polarization orientations and outputs the first and second optical carrier components at the third and fourth ports of the splitter/combiner and the splitter/combiner combines the first and second optical data signals having different polarization orientations and outputs the combined optical data signals at the second port of the splitter/combiner; and
  wherein the first and second polarization converters convert first and second optical carrier components having different polarization orientations, and received at the first ports of the first and second polarization converters, into first and second optical carrier components having same polarization orientations and outputs the first and second optical carrier components have the same polarization orientations at the second ports of the polarization converters.

2. The transmitter of claim 1, wherein the modulator includes at least one traveling wave electrode having a first electrical data input connected to provide an electrical data signal in a first direction through the at least one electrode, and having a second electrical data input connected to provide an electrical data signal in a second direction through the at least one electrode, wherein the first direction and the second direction are opposite of each other.

3. The transmitter of claim 1, wherein the modulator is a single Mach-Zehnder modulator having a single traveling wave electrode with a first electrical data input connected to one end of the electrode and a second electrical data input connected to another end of the electrode.

4. The transmitter of claim 1, wherein the modulator is a double parallel Mach-Zehnder modulator.

5. The transmitter of claim 4, wherein the modulator includes:
  a first traveling wave electrode having first and second ends, and having first and second electrical data inputs respectively connected to the first and second ends of the first electrode; and
  a second traveling wave electrode having first and second ends, and having third and fourth electrical data inputs respectively connected to the first and second ends of the second electrode.

6. The transmitter of claim 1, wherein the first and second data polarization converters convert first and second optical data signals having same polarization orientations, and received at the second ports of the first and second polarization converters, into first and second optical data signals having orthogonal polarization orientations at the first ports of the polarization converters.

7. An optical transmitter, comprising:
  an optical source for producing an optical carrier;
  a circulator having a first port connected to the optical source, and having second and third ports;
  a splitter/combiner having a first port connected to the second port of the circulator, and having second and third ports;
  an electrical carrier source outputting an electrical carrier;
  first and second electrical modulators, each having a carrier input connected to the electrical carrier source, each having a data input, and each having an output, wherein electrical data input to the data input are output as electrical data signals on the electrical carrier;
  a signal conditioner having first and second inputs connected to the outputs of the first and second electrical modulators, and having first and second outputs; and
  an optical modulator having first and second optical ports respectively connected to the second and third ports of the splitter/combiner, and having first and second electrical inputs connected to the first and second outputs of the signal conditioner, and wherein the optical modulator modulates electrical data signals from the first and second electrical modulators onto subcarriers of the optical carrier to produce an output optical signal, wherein the subcarriers of the optical carrier are combined to have different polarization orientations when the output optical signal exits the transmitter through the splitter/combiner.

8. The transmitter of claim 7, wherein the signal conditioner is a 2×2, ninety degree phase shift signal combiner.

9. A method of transmitting optical signals, comprising:
  producing an optical carrier;
  splitting the optical carrier into first and second optical carrier components, wherein splitting includes splitting the optical cater into first and second optical carrier components having same polarization orientations;
  passing the optical carrier components in opposite directions through a modulator;
  converting a first electrical data signal into a corresponding first optical data signal;

converting a second electrical data signal into a corresponding second optical data signal;

further comprising, after converting the first electrical data signal and after converting the second electrical data signal, converting first and second optical data signals having same polarization orientations into first and second optical data signals having different polarization orientations; and combining the first and second optical data signals to form a combined optical data signal including first and second optical data signals with different polarization orientations.

10. The method of claim 9, wherein converting first and second optical data signals having same polarization orientations includes converting first and second optical data signals having same polarization orientations into first and second optical data signals having orthogonal polarization orientations.

11. The method of claim 9, wherein:

converting the first electrical data signal includes converting the first electrical data signal onto the optical carrier; and converting the second electrical data signal includes converting the second electrical data signal onto a subcarrier of the optical carrier.

12. The method of claim 9, wherein:

converting the first electrical data signal includes applying the first electrical data signal to the modulator in a same direction as the first optical carrier component; and converting the second electrical data signal includes applying the second electrical data signal to the modulator in a direction opposite that of the first electrical data signal.

13. The method of claim 12, wherein converting the first electrical data signal and converting the second electrical data signal are performed simultaneously.

14. The method of claim 12, wherein converting the first electrical data signal and converting the second electrical data signal are performed at different times.

15. The method of claim 9, wherein splitting includes splitting the optical carrier into first and second optical carrier components having different polarization orientations.

16. The method of claim 15, further comprising converting the first and second optical carrier components having different polarization orientations into first and second optical carrier components having same polarization orientations.

17. The method of claim 9, wherein converting first and second optical data signals having same polarization orientations includes converting first and second optical data signals having same polarization orientations into first and second optical data signals having orthogonal polarization orientations.

18. The method of claim 9, wherein:

converting the first electrical data signal includes converting the first electrical data signal onto the optical carries; and converting the second electrical data signal includes converting the second electrical data signal onto the optical carrier.

19. The method of claim 9, wherein:

converting the first electrical data signal includes converting the first electrical data signal onto a subcarrier of the optical carrier; and converting the second electrical data signal includes converting the second electrical data signal onto a subcarrier of the optical carrier.

* * * * *

UNITED STATES PATENT AND TRADEMARK OFFICE
CERTIFICATE OF CORRECTION

PATENT NO. : 7,142,788 B2
APPLICATION NO. : 10/123821
DATED : November 28, 2006
INVENTOR(S) : Alistair J. Price It is certified that error appears in the above-identified patent and that said Letters Patent is hereby corrected as shown below:

Column 20, Claim 9, ln. 62, delete "cater" and insert -- carrier --.

Column 22, Claim 18, ln. 23, delete "carries" and insert -- carrier --.

Signed and Sealed this

First Day of December, 2009

David J. Kappos
*Director of the United States Patent and Trademark Office*